(12) United States Patent
Phipps et al.

(10) Patent No.: US 9,388,873 B1
(45) Date of Patent: *Jul. 12, 2016

(54) TORSO PROTECTION SYSTEM

(71) Applicants: Emerson Spalding Phipps, Dallas, TX (US); Charles Edward Phipps, Dallas, TX (US)

(72) Inventors: Emerson Spalding Phipps, Dallas, TX (US); Charles Edward Phipps, Dallas, TX (US)

(73) Assignees: Emerson Spalding Phipps, Dallas, TX (US); Charles Edward Phipps, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,427

(22) Filed: Jul. 11, 2014

Related U.S. Application Data

(63) Continuation-in-part of application No. 13/792,812, filed on Mar. 11, 2013, now Pat. No. 9,089,180, which is a continuation-in-part of application No. 13/227,901, filed on Sep. 8, 2011.

(51) Int. Cl.
| | | |
|---|---|---|
| *A42B 3/12* | (2006.01) | |
| *A42B 3/06* | (2006.01) | |
| *F16F 3/087* | (2006.01) | |
| *A41D 13/05* | (2006.01) | |
| *A41D 13/08* | (2006.01) | |
| *A41D 13/06* | (2006.01) | |
| *G01L 5/00* | (2006.01) | |
| *A63B 71/10* | (2006.01) | |

(52) U.S. Cl.
CPC .......... *F16F 3/0876* (2013.01); *A41D 13/0518* (2013.01); *A41D 13/06* (2013.01); *A41D 13/081* (2013.01); *A42B 3/12* (2013.01); *G01L 5/0052* (2013.01)

(58) Field of Classification Search
CPC ............ A42B 3/12; A42B 3/064; A42B 3/00; A42B 3/0406; A63B 71/10
See application file for complete search history.

(56) References Cited

U.S. PATENT DOCUMENTS 9,089,180 B2 * 7/2015 Phipps ..................... A42B 3/12

* cited by examiner

*Primary Examiner* — Bobby Muromoto, Jr.
(74) *Attorney, Agent, or Firm* — Charles E. Phipps; Locke Lord LLP

(57) ABSTRACT

A protective member includes outer and inner layers interconnected by multiple connectors under tension along their longitudinal axis. The connectors absorb energy from an impact force by resisting further tension along their longitudinal axis, can elongate along their longitudinal axis and allow the layers to move relative to each other. The protective member can be used in numerous applications and environments, including for participants in sports, in applications including bumpers, passenger cabins, car seats, beds, torso protection, ships, gloves, footwear and items.

3 Claims, 13 Drawing Sheets

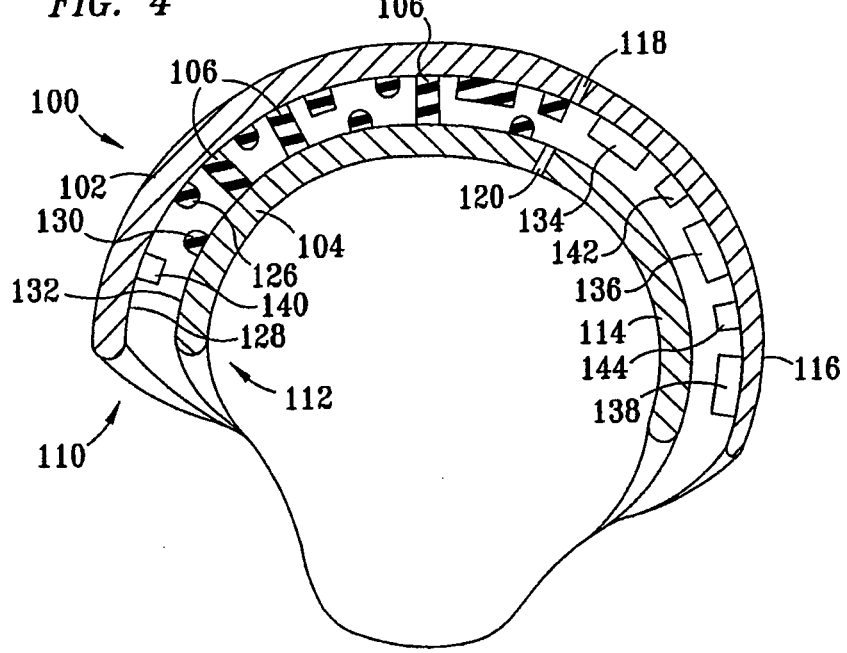
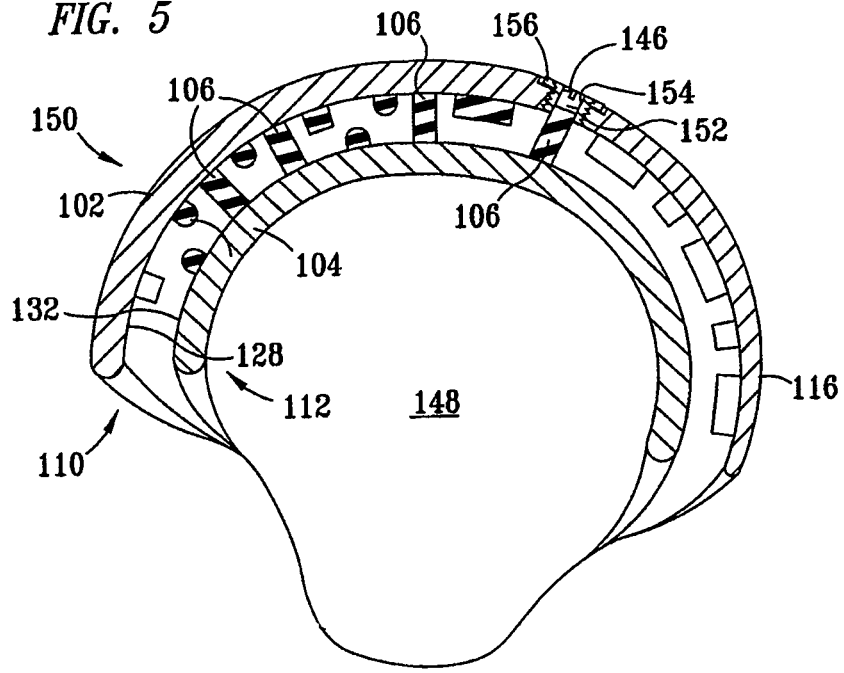

TORSO PROTECTION SYSTEM

RELATED APPLICATIONS

This application is a continuation-in-part of an application filed on Mar. 11, 2013, U.S. application Ser. No. 13/792,812 ("the '812 application"). This application claims the benefit of the priority date of the '812 application. The '812 application is a continuation-in-part of U.S. application Ser. No. 13/227,901 ("the '901 application") filed Sep. 8, 2011. This application also claims the priority date of the '901 application. Both the '812 application and the '901 application are hereby incorporated by reference.

TECHNICAL FIELD OF THE INVENTION

The present invention generally relates to protective members useful as helmets and other protective members comprising connectors such as extension springs that are under tension and can absorb, at least in part, an impact force.

BACKGROUND OF THE INVENTION

Protective members such as helmets have been worn to protect a user from head injuries. Protective helmets have been used for many endeavors, including for participants in sports (e.g., football, baseball, lacrosse, racing, cycling, skiing), for commercial activities (e.g., construction) and for military personnel (e.g., pilots, soldiers). Prior art helmets have generally comprised a single layer which is rigidly secured to the head of a user.

U.S. Pat. No. 4,287,613, entitled "Headgear With Energy Absorbing and Sizing Means" disclosed a headgear of the type used by football players. The headgear included a web suspension means comprising looped straps held together by a cord that threads through the looped straps and is knotted. The web suspension means performed a sizing function and maintained the top of the wearer's head out of contact with the upper wall of the helmet shell. The ends of the straps were connected to an encircling band that was fastened at selected locations to the helmet shell.

U.S. Pat. No. 5,035,009, entitled "Protective Helmet and Liner" disclosed a protective helmet having a sheet of sound deadening material between impact force absorbing pad structures disposed on the interior of the protective helmet.

In United States Patent Application 2010/0101005, a protective helmet is disclosed that affords guided movement of an inner shell 100 within an outer shell 101 by use of two or more rigid connecting protrusions 103 disposed within slots 102.

United States Patent Application 2013/0205480 discloses a protective helmet which includes a motion restrictor device.

Recent advances in helmets include U.S. Pat. No. 6,826,509, entitled "System And Method For Measuring The Linear And Rotational Acceleration Of A Body Part." The '509 patent discloses a system using accelerometers to collect, record and process head acceleration data. See FIG. 7 of the '509 patent. See also the related U.S. Pat. No. 7,526,389.

U.S. Pat. No. 7,954,177 entitled "Sports Helmet" disclosed a sports helmet having ear flaps and jaw flaps.

Helmets are designed to prevent or reduce concussions in users, such as athletes. Concussions can have immediate and long term effects. Immediate effects can include dizziness, confusion, nausea, loss of consciousness and difficulty seeing and hearing. Athletes suffering concussions have been diagnosed, including after their deaths, with chronic traumatic encephalopathy ("CTE"). The study of CTE indicates that the condition is related to the behavior of a brain protein called tau. Concussions may cause diffuse axonal injury ("DAI"). Axons connect brain neurons together and allow them to communicate with another. Acceleration of the brain can apparently cause injury to axons. Cerebrospinal fluid ("CSF") is also implicated in the mechanism of brain injuries. CSF is more dense as compared to brain tissue. The movement of CSF during an impact may affect the amount and location of injury to brain tissue. Injuries to the brain resulting from impacts are referred to a coup and countrecoup injuries. Coup is a French word meaning blow or impact. Countre is a French word meaning opposite. Thus a coup injury occurs on the side of the brain facing the impact; whereas a countrecoup injury occurs on the opposite side of the brain from the impact.

SUMMARY OF THE INVENTION

A protective member includes an outer layer and an inner layer interconnected by multiple connectors, such as extension springs, under tension along their longitudinal axis. The connectors absorb energy from an impact force by resisting further tension along their longitudinal axis, can elongate along their longitudinal axis and allow the layers to move relative to each other. The protective member reduces the amount of linear and rotational acceleration experienced by the protected area, item or individual. The protective member can be used in numerous applications and environments.

BRIEF DESCRIPTION OF THE DRAWINGS

For a more complete understanding of the invention and for further advantages thereof, reference is now made to the following Description of the Preferred Embodiments taken in conjunction with the accompanying Drawings in which:

FIG. 4 is a cross-sectional view of a protective helmet according to the present invention depicting additional components and features.

FIG. 5 is a cross-sectional view of a protective helmet according to the present invention depicting an adjustor to adjust the connectors.

DESCRIPTION OF THE PREFERRED EMBODIMENTS

Figure 1:
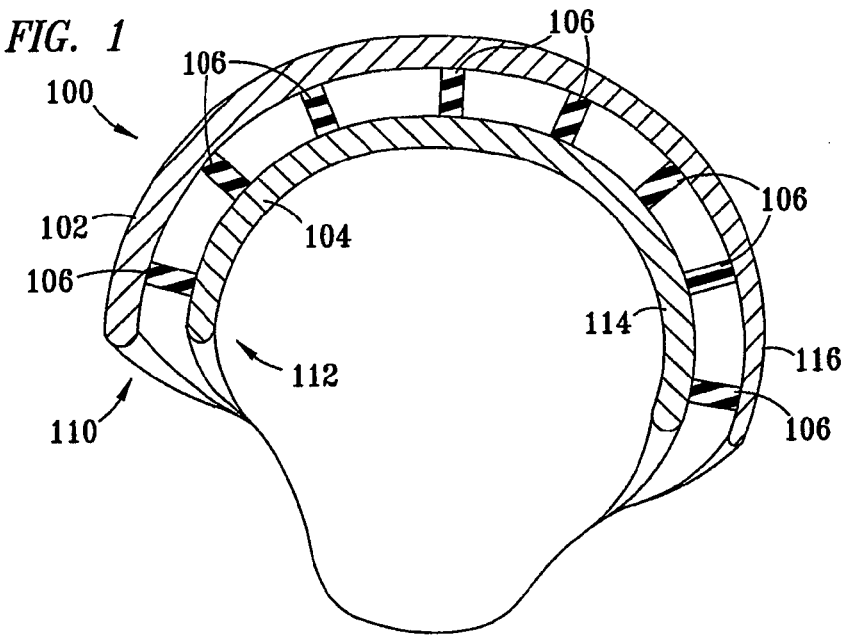
FIG. 1 is a cross-sectional view of a protective helmet according to the present invention.

The following detailed description of the preferred embodiments should be read in view of the FIGS. in which the same reference numerals are used to refer to the same or corresponding components of the novel protective helmet of the invention.

As shown in FIG. 1, the novel protective helmet 100, includes an outer layer 102, an inner layer 104 and multiple connectors 106. The multiple connectors 106 are disposed between and connect inner layer 104 to outer layer 102. Connectors 106 preferably connect outer layer 102 to inner layer 104 such that each connector 106 is under tension along its longitudinal axis. As understood by those skilled in the art, the term "tension" means the opposite of compression. Being "under tension" therefore means being subject to a force that tends to stretch the connector. Thus, the tension force on the connectors 106 is a force tending to stretch or elongate the connectors 106. The connectors 106 are not fully stretched in their initial or at rest configuration; thus they retain the ability to resist further tension. The connectors 106 are able to absorb energy from an impact force by resisting further tension along their longitudinal axis. The connectors 106 can also elongate along their longitudinal axis. The protective helmet 100 can further include other connectors 106 that are not under such tension, but that can become under tension as inner layer 104 and outer layer 102 move relative to each other. Each of inner layer 104 and outer layer 102 may, in certain embodiments, be referred to individually as a shell.

Figure 2A:
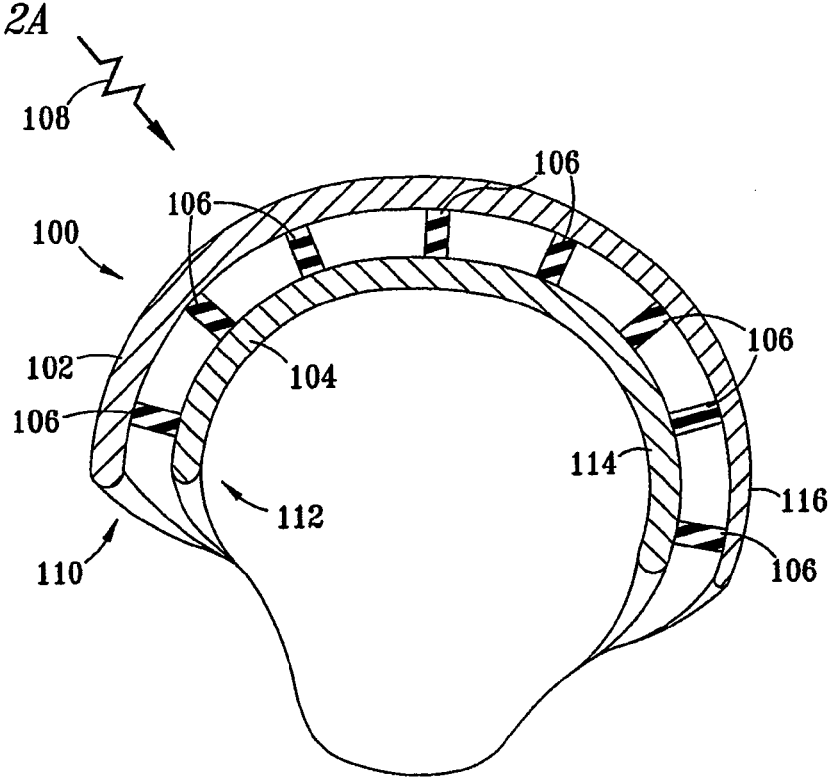
FIGS. 2A-2B depicts the relative orientations of the layers of the protective helmet of the present invention before, during and after an impact with an object.
Figure 2B:
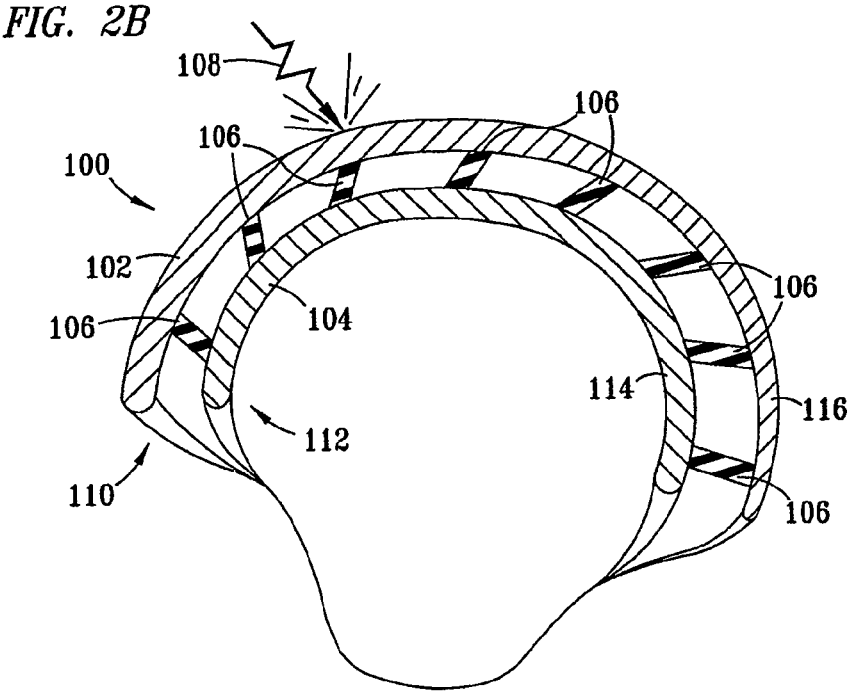

As shown in FIGS. 2A-2B, the multiple connectors 106 are deformable so as to allow relative movement between inner layer 104 and outer layer 102. Protective helmet 100 in a state of rest may exist as shown in FIG. 2A prior to encountering a force 108. The inner layer 104 and outer layer 102 may move relative to each other in an essentially un-guided manner. Thus, the relative movement of outer layer 102 and inner layer 104 can depend upon the location, amount and direction of an impact force 108.

As shown in FIGS. 2A-2B, force 108 is an external force that is less than the amount of force needed to move the head of a user that is in a relatively fixed position. This amount of force may be considered a "low impact" external force. Force 108, however, could also be an internal force exerted by the head of a user. In the case of a low impact external force 108, upon the exertion of the external force 108, the front portion 110 of outer layer 102 is impacted. As a result, the force 108 is transferred to outer layer 102 and deforms at least some of the connectors 106. The distance between the front portion 110 of outer layer 102 and the front portion 112 of inner layer 104 may be reduced as shown in FIG. 2B as a result of impact. To absorb the force 108, the connectors 106 connecting the rear portion 114 of inner layer 104 and the rear portion 116 of outer layer 102 are stretched generally along their longitudinal axis. Thus, the length of these rear connectors becomes greater as a result of an impact force occurring generally on the opposite side of the helmet 100. By resisting further tension along their longitudinal axis, these rear connectors 106 serve to absorb the force 108. In addition, the connectors 106 connecting the front portion 110 and the front portion 112 may be slackened or under less tension. Slackening is the reduction of tension. Thus, the length of the front connectors becomes less as a result of an impact force occurring generally on their side of the helmet 100. The connectors 106 absorb forces and/or resist deformation. Preferably, connectors 106 are also elastic in that, after an impact, they seek to regain their shape and/or orientation to their original position prior to the exertion of another force 108. Preferably, this reversal occurs quickly. After an impact, inner layer 104 and outer layer 102 preferably return to their original relative orientation as shown in FIG. 2A.

In one preferred embodiment, all of the connectors 106 are under tension such that each is further stretched as a result of an impact occurring on the opposite side of the helmet 100. The connectors 106 therefore do not serve to absorb forces through compression along their longitudinal axis; rather, they resist further tension or stretching generally along their longitudinal axis. Thus, connectors 106 absorb energy from an impact force 108 by resisting further tension along their longitudinal axis, generally on the opposite side of the protective helmet 100 than the side of impact. Thus, the connectors 106 allow the outer layer 102 and the inner layer 104 to move relative to each other so as to reduce: the amount of force from an impact that is transferred to the head of a user; the amount of force from the head of a user that is transferred to the environment surrounding protective helmet 100; and/or the amount of linear or angular acceleration experienced by the head of a user.

The protective helmet 100 therefore permits movement of the inner layer 104 relative to the outer layer 102. As the connectors 106 that are disposed generally on the opposite side of the protective helmet 100 than the side of impact absorb energy from an impact force 108, the amount of energy absorbed by each such connector 106 may vary. Preferably, the generally oppositely disposed connector 106 absorbed the most impact force energy with one or more neighboring connectors 106 also absorbing impact force energy, but a lessor amount.

An "equal" force 108 is an amount of force needed to equal the resistance-to-change in the position of the head of a user in a fixed position or to counter the momentum of the head of a user in motion. A "high impact" force 108 is an amount of force needed to change the position of the head of a user in a fixed position or to exceed the momentum of the head of a user in motion. In certain embodiments, it is preferred that connectors 106 are sufficiently strong such that outer layer 102 does not engage inner layer 104, even when experiencing a high impact force 108.

Protective helmet 100 reduces the amount of movement of the head and neck of a user that would otherwise occur. Protective helmet 100 can reduce the amount of a force 108 that is transferred to the head and neck of a user. Protective helmet 100 can afford a reduction in the amount of force transferred from the helmet to another object, such as another helmet. The multiple connectors 106 absorb energy from an impact with force 108 caused by another object and allow outer layer 102 to move relative to inner layer 104 so as to reduce the amount of force from said impact that is transferred to the head and neck of a user. In addition, the movement of outer layer 102 relative to inner layer 104 reduces the amount of movement, including rotational movement, of the head and neck of a user that would otherwise occur from an impact. Likewise, the force of the head of a user in motion that is transferred to another object is reduced by the relative movement of inner layer 104 to outer layer 102.

The afforded reduction in the transfer of force is beneficial in reducing head and neck injuries. In addition, the afforded reduction in relative movement and/or the change in momentum of the head of the user is beneficial in reducing head and neck injuries. The reduction of the amount of change in position and/or of momentum of the head of the user afforded by the present novel protective helmet 100 is a significant advantage over prior art helmets. If the head of the user is at rest relative to its surrounding environment, it is considered to have no momentum. Thus, an impact with an object exerting force 108 may change the position of the head of the user. If the head of the user is in motion relative to its surrounding environment (e.g. a football field), then it has momentum. Thus, an impact with an object exerting force 108 may change the momentum of the head of a user. Protective helmet 100 affords a reduction in the amount of change in position of the head of a user at rest that would otherwise occur as a result of an impact with an object exerting a force 108. Protective helmet 100 affords a reduction in the amount of a change in momentum that the head of a user in motion would otherwise experience as a result of an impact with an object exerting a force 108. Protective helmet 100 affords a reduction in the amount of linear and angular acceleration.

In the event that the outer layer 102 is in a fixed position, such as possibly for a race car driver, protective helmet 100 would still afford a reduction in the amount of force and or change in momentum that would occur in the absence of protective helmet 100 in view of the movement of inner layer 104 relative to outer layer 102 and the response of connectors 106 to a force 108, whether it be a force external to protective helmet 100 or an internal force caused by the head of a user or a combination thereof.

Force 108 is not part of the novel protective helmet 100. Force 108 could be any object, such as another helmet, a surface such as a wall or the ground; or in a commercial environment could be a falling object; or in the case of a military environment could be a bullet or other projectile.

Outer layer 102 may absorb some of the impact of a force 108. Connectors 106 may absorb some of the impact of a force 108. Inner layer 104 may absorb some of the impact of a force 108. Preferably, the impact energy of force 108 is absorbed by the protective helmet 100 so that no amount of the force is transferred to the head of a user. A "reduction" in force includes reducing it to zero.

Connectors 106 can be any material that absorbs forces, such as rubber or springs. Connectors may be of different lengths and thicknesses. Connectors 106 can vary along their length as to the type of material and/or the amount of retention force or force absorption. Connectors 106 can have different cross-sectional shapes, e.g., circular. The cross-section of the connectors 106 can also vary along the length of the connector 106. Connectors 106 can be of different lengths. Connectors 106 can be forked or pronged at one or both ends. Connectors 106 can be intertwined. Connectors 106 can be tubular. Connectors 106 can be of different angles of attachment, including different angles at each connecting end relative to the inner layer 104 and to the outer layer 102. For example, connectors 106 can be connected perpendicular to the surface of outer layer 102 or inner layer 104 or can connect to such layers at an angle. Such angles could be measured relative to a tangent line intersecting the point of a connector 106 at which it is connected to either outer layer 102 or inner layer 104. Multiple connectors 106 can be connected at a single point on either or both outer layer 102 or inner layer 104.

Figure 6:
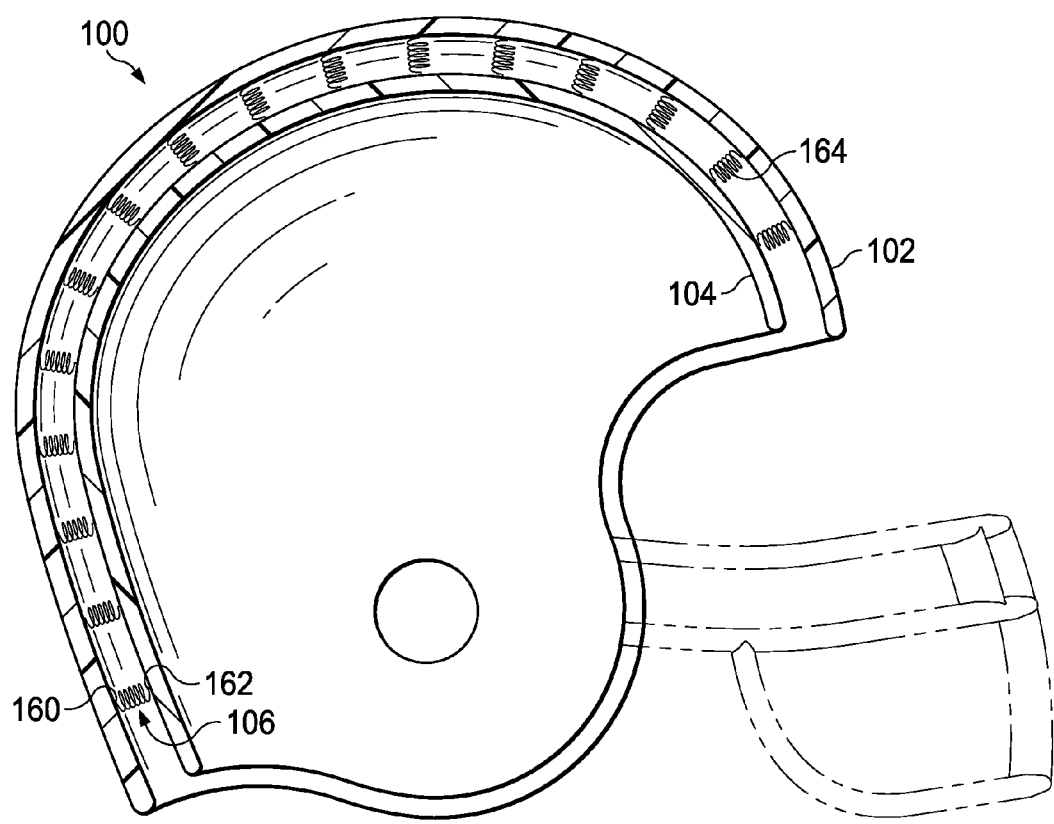
FIG. 6 is a cross-sectional view of a protective helmet according to the present invention depicting the connectors as extension springs.

As shown in FIG. 6, Connectors 106 can be comprised of extension springs. The extension springs oppose further extension. When the layers 104 and 102 move apart, the extension spring 106 attempts to bring them closer together again. Extension springs absorb and store energy and create a resistance to a pulling force. They can provide a return force. A protective helmet for protecting the head or body of a user can comprise an outer layer 102, an inner layer 104 connected to outer layer 102 by multiple connectors 106 wherein each connector has a longitudinal axis and comprises an extension spring being under tension along its longitudinal axis. The protective helmet 100 allows the extension springs 106 to absorb energy from an impact force by resisting further tension along the longitudinal axis of one or more of the extension springs. Moreover, the configuration of protective helmet 100 allows the outer layer 102 and the inner layer 104 to move relative to each other and reduce the amount of force from said impact that is transferred to the head or body of a user. The extension springs can absorb forces by elongating along their longitudinal axis. The extension springs can be attached at a first end 160 to the outer layer 102 and at a second end 162 to the inner layer 104. One or more of the ends 160 and 162 can be adjustably, removably, pivotally and or rigidly attached. Adjustment of tension can be performed using any appropriate mechanisms, such as a guitar-string adjustment mechanism. By varying the tension on the connectors, number of connectors and orientation of connectors, the dynamic characteristics of the protective helmet 100 can be tailored as desired.

The springs can have hooks, eyes, or other interface geometry at the ends to attach to the layers 102 and 104. The springs can be made of any suitable material, including music wire, oil tempered chrome silicon, or stainless steel. Spring design features involve considerations of outer diameter, inner diameter, wire diameter, free length and extended length. The free length is the overall length of a spring in the unloaded position. The extended length is the length at full rated extension. The spring rate is the force per unit spring deflection. The maximum load is the load at full extension. Preferably, the extension springs have initial tension. The measure of the initial tension is the load necessary to overcome the internal force and to begin coil separation. Thus, unlike a compression spring, which has zero load at zero deflection, an extension spring can have a preload at zero deflection. This built-in load, called initial tension, can be varied.

Preferably, connectors 106 are extension springs that connect outer layer 102 to inner layer 104 such that the connectors in a rest position have already exceeded their initial tension. The initial load tension can be referred to as an initial force, F1 or Force 1. Initial load tension is the amount of tension required to begin coil separation. Thus, in a preferred configuration, connectors 106 are connected such that they are loaded under a second force (F2 or Force 2) that exceeds F1. During engagement of the helmet, the connectors 106 preferably do not exceed a force maximum, Force Maximum or FM. Thus, F2 is greater than F1 but less than FM. As the helmet 100 receives a force of impact (FI), the impact force is absorbed by increasing the force on certain springs to be greater than F2 and preferably does not become so great that it exceeds FM. The impact force is absorbed by connector springs 106 generally on the opposite side of helmet 100 than the side that received the impact. Thus, FI is distributed around outer layer 102 and absorbed by connectors 106 generally disposed on the opposite side of the impact area. For connectors closest to the impact zone, the load tension may actually decrease such that the force on those extension springs becomes less than F2 but preferable not less than F1. Inner layer may therefore be allowed to move or continue moving toward the direction of impact which allows for a reduction in head deceleration that would otherwise occur. As the impact force is removed, the extension springs regain their original orientation such that the springs return to F2. Likewise, outer layer 102 and inner layer 104 return to their original orientation. Preferably, the springs that absorbed the force go from FM or less back down to F2 and the springs that did not absorb the force go from F1 or there above back up to F2. Helmet 100 is thus ready to absorb another impact force.

A drawbar or its equivalent may be included to take effect at or before the moment when the impact force that is experienced by a given connecter reaches FM. Thus, connectors 106 can be or can include one or more drawbar springs or its equivalent. In some drawbar springs, the load is applied at the ends of long loops that pass through the spring's center and are hooked around the opposite end, thus compressing the spring upon loading. Drawbar springs are used in potential overload situations and offer a built-in definite stop that will continue to carry a static load after reaching the maximum extended length. In the present invention, the built-in stop could also be accomplished via other design features including the padding member 126, padding member 130, or tethers.

Protective helmet can also be used in other applications. In one embodiment, the helmet is cylindrical. (See FIG. 17). In this embodiment, the protective device can be used in numerous applications, including as goal posts, protective members (e.g. for ski lift poles) or can be used in body armor. (See FIGS. 11A and 11B). In the body armor embodiment, outer layer 102 and inner layer 104 are designed to generally conform to the body of a user or parts thereof (e.g. arms, legs). In such an embodiment, inner layer 104 can be a rigid matrix affixed to the body of a user. In a commercial application, such as for a motor vehicle, helmet 100 can be used as a bumper wherein outer layer 102 surrounds the vehicle or car and inner layer 104 is affixed to the vehicle; thus allowing connectors 106 to absorb impact forces and allow passengers or cargo to decelerate at a lower rate so as to minimize injuries. (See FIG. 7). Helmet 100 can also be used in a motor vehicles such that the passenger cabin is surrounded by inner layer 104 and outer layer 102 is affixed to the vehicle. (See FIG. 8). In certain applications, in may be desirable to have a protective helmet 100 in the bumper application and another protective helmet in the passenger cabin application, which would afford additional safety to passengers and cargo. In another embodiment, inner layer can be secured around an axle or other rotatable member and outer layer 102 can be in direct or indirect ground contact so as to absorb road impacts.

Connectors 106 can have different shapes, be made of various materials and can serve numerous functions. In one embodiment, connectors 106 are cylindrical. Connectors 106 can be of solid material or hollow (e.g., the same material used in resistance tubes). Connectors 106 can also be configured to be replaceable. Hollow connectors can include internal connectors 106 that can in turn be solid or hollow. In one embodiment, the inner connector can be under a different amount of tension than the outer surrounding connector. For example: an inner connector can be under less or no tension but can have a higher resistance to deformation; whereas, the outer connector can be under greater tension, but can afford a lesser amount of resistance to deformation; or vice versa. Connectors 106 can also serve different functions, including the use of some connectors 106 to offset the force of gravity on outer surface 102 so as to maintain the optimum relative orientations between outer layer 102 and inner layer 104. Connectors 106 can also be subdivided into sets of connectors, each set having its own function, shape, orientation and or type of material. In one embodiment, there are three sets of connectors, a first set serving to absorb low impact forces, a second set serving to absorb essentially equal forces and a third set serving to absorb high impact forces. In one embodiment, connectors 106 are disposed in lines parallel to the expected angle of impact on opposite sides of protective helmet 100, preferably along the same line as the angle of approach of force 108.

Preferably, at least one set of connectors 106 are under tension and are comprised of extension springs and a second set of connectors are not under tension and are comprised of elastomeric materials. The second set preferably being lighter than the first set in overall weight and capable of absorbing more force than the connectors in the first set. Additional sets of connectors can be included.

In one embodiment of protective helmet 100 as used in combat environments, a first set of connectors 106 under tension are included that absorb normal blunt forces and a second set of connectors 106 are included that, in their original orientation, are not under tension but that become under tension as the first set of connectors are stretched along a first distance as measured along the longitudinal axis of the first set of connectors. The first distance should be less than the distance required for a projectile to pierce the outer layer 102. Because the first set of connectors 106 can be connected either perpendicularly to a plane tangent to the outer layer 102 or at an angle thereto, the length of the first distance may be the same or different than the actual thickness of the outer layer 102. The second set of connectors 106 are preferably able to absorb much stronger forces caused by a projectile such as a bullet. The second set of connectors 106 further are connected between the outer layer 102 and the inner layer 104 such that they not only absorb impact forces but induce angular rotation of the outer layer 102 relative to the inner layer 104 as a projectile is impacting and or entering outer layer 102. This induced angular rotation serves many useful purposes, including redirecting the angle of approach of the projectile and exposing more of the projectile to the protective outer layer. One configuration for the second set of connectors 106 can involve the second set of connectors being connected at an angle to a line that is perpendicular to a plane tangent to the outer layer 102. In this configuration, not only do the second set of connectors 106 absorb forces, but they induce rotation of the outer layer 102 relative to the inner layer 104

Connectors 106 can serve to reduce the amount of multiple forces 108, including an external force 108 that impacts outer layer 102 and an internal force 108 caused by the head of a user. In this case, the amount of the external force 108 that is transferred to the head of a user is reduced and the amount of impact force 108 of the head of a user with protective helmet 100 is reduced. In addition to reducing the amount of transferred forces of impact, protective helmet 100 can reduce the amount and/or the speed of relative change in position of the head of a user of protective helmet 100. Protective helmet 100 helps to reduce the occurrence of concussions, the occurrence of chronic traumatic encephalopathy, diffuse axonal injury, the movement of cerebrospinal fluid during an impact and coup and/or countrecoup injuries.

Due to the shape of a user's head, many forces induce rotational accelerations. Protective helmet 100 serves also to reduce the amount of rotational force exerted by a force 108. Rotational forces can cause head and neck injuries. Thus, the reduction in the amount of rotational force transferred to the head of a user as a result of protective helmet 100 is a significant advantage over prior art helmets.

Upon impact of an impact force 108 with the outer layer 102 of protective helmet 100, connectors 106 can exert a force on inner layer 104 along the same line of impact but on the opposite side of the impact. The afforded displacement of impact allows for the reduction in the amount of force 108 transferred to the head of a user and/or allows for a reduction in the change of momentum of the head of a user. The afforded displacement of impact also allows for a decrease in the amount of acceleration or deceleration that the head of a user would otherwise experience.

In one preferred embodiment, the connectors 106 are arranged so as to afford the maximum reduction in the force of impact from any given angle. In this embodiment, the connectors 106 substantially surround the head of a user. In other words, to the extent that the inner layer 104 can be referenced as somewhat spherical, the connectors 106 would be connected to inner layer 104 along preferably greater than at least 180 degrees based upon any plane cross section taken through the center of the sphere defined by the inner layer 104. Preferably, connectors 106 are displaced in at least one complete hemisphere of the general sphere of the head of a user. Such sphere being divided into two equal hemispheres by any plane passing through its center.

In one preferred embodiment, the connectors 106 are disposed generally symmetrically. For example, the connectors 106 are generally symmetric along a plane of symmetry crossing through the center of the sphere generally formed by the protective helmet 100. In one preferred embodiment, this plane of symmetry is vertical and passes from the front portion 110 of the outer layer 102 through the center of the sphere to the rear portion 116 of the outer layer 102 of protective helmet 100.

Preferably, connectors 106 are the only connections between inner layer 104 and outer layer 102. In the event that there are other members connecting inner layer 104 to outer layer 102, such additional members are preferably configured so as to not reduce the energy absorption otherwise afforded by connectors 106.

As shown in FIG. 2A, when the force 108 exerted as shown in FIG. 2B is removed, the outer layer 102 and the inner layer 104 return to their orientation as shown in FIG. 2A. Likewise, connectors 106 preferably return to their original length and orientation. The connectors 106 preferably allow for repeated cycles of force absorption and recovery.

Preferably, the outer layer 102 is designed so as to ensure that all external forces impact outer layer 102 prior to engaging inner layer 104. Additional inner and or outer layers can be included with their own connectors. In these nested configurations the connectors between layers can be considered waves of force absorption. These waves can afford the same amount of force absorption as each other or serve as stepped up or stepped down amounts of force absorption. Such additional layers may afford greater absorption of rotational forces to thereby minimize user-perceived forces, such as neck loads and neck rotation. Each layer can be independently and selectively operable such that one layer is allowed, prohibited, phased, selected or timed to act under varying predetermined conditions or real-time conditions. In some scenarios, it may be preferable for the inner most wave of connectors to engage before an outer wave of connectors is engaged or vice versa. For example, in a combat helmet application, protective helmet 100 could include a second outer layer with a second plurality of connectors connecting the second outer layer to the outer layer 102. The second plurality of connectors could have greater force absorption properties as compared to the first plurality of connectors 106. In this embodiment, the second set of connectors serve to absorb the impact force of a projectile whereas the first set of connectors 106 serve to absorb weaker impacts or blunt forces.

Preferably, connectors 106 are connected directly between inner layer 104 and outer layer 102. In certain embodiments, it is preferred that the angle of contact of the connectors to the inner layer 104 and outer layer 102 be approximately 90 degrees.

Preferably for environments involving heat, outer layer 102 can include multiple openings 118 to allow air circulation, as shown in FIG. 4. Likewise, inner layer 104 can include multiple openings 120.

Figure 3:
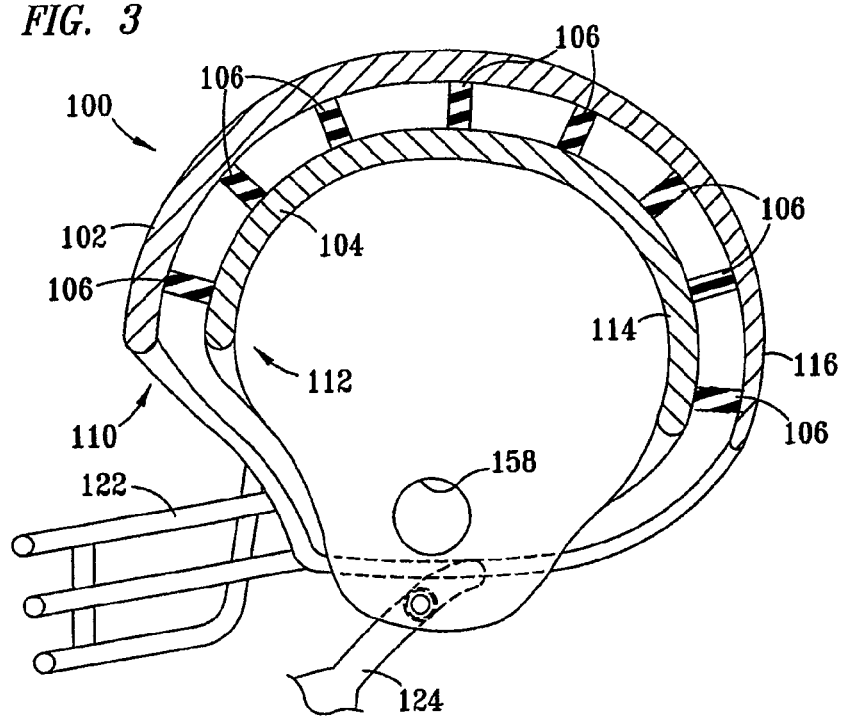
FIG. 3 is a cross-sectional view of a protective helmet according to the present invention as used for a football helmet showing the face guard connected to the outer layer and a chin strap connected to the inner layer, this embodiment can afford a reduction in the change in momentum or position of the head of a user that would otherwise occur.

As shown in FIG. 3, protective helmet 100, when used in certain application (e.g., as a football helmet), can include a face guard 122 and/or a chin strap 124. Face guard 122 is preferably secured to outer layer 102. Chin strap 124 is preferably connected to inner layer 104. In this embodiment, the head of a user is fixed relative to the inner layer 104 not only by means of the shape of the inner layer 104 but also by use of the chin strap 124. The outer layer 102 and the optional face guard 122 are allowed to move relative to inner layer 104, including as a result of an impact from a force 108 and/or an internal force caused by the head of a user.

Face guard 122 can be a clear, transparent material. Face guard 122 can afford a reduction in the amount of light (e.g., serve as a sun visor). Face guard 122 can be formed of a unitary, solid material or may include one or more openings or bars.

Contrary to the present invention, prior art football helmets undesirably use a chin strap connected to the outermost rigid layer that fixes the position of the head of the user to the relative position of the outermost rigid layer. One advantage of this embodiment of the present invention is afforded by the ability to connect a chin strap 124 to inner layer 104 to allow for movement of inner layer 104 relative to outer layer 102. In this embodiment, protective helmet 100 can be secured to the head of a user, but the outer layer 102 is not directly secured to the head of a user and thus can move relative to inner layer 104 in response to an impact force 108. Thus, in this embodiment of the present invention, the chin strap would not directly transfer an impact force 108 to the head of a user; as do traditional helmets.

Outer layer 102 can be formed of a single shell of rigid or flexible material or can have multiple layers or zones of the same or different material. Outer layer 102 can be made of clear, transparent material. Preferably, when outer layer 102 is a flexible material it can deform in a plane that is approximately 90° perpendicular to the direction of impact force 108 and outwardly as viewed from the center of the protective helmet 100 such that the outer layer 102 elongates in the plane that is approximately 90° perpendicular to the direction of impact force 108. When outer layer 102 is a flexible material and deforms outwardly in a plane that is approximately 90° perpendicular to the direction of impact force 108, the connectors 106 disposed within or near the plane thus serve to absorb more of the force of impact that they would if the outer layer 102 did not flex outwardly.

Outer layer 102 can be made of a high force resistance material, including materials used in protective vests, including layers of very strong fiber (e.g., Kevlar) used to slow and deform a projectile, such as a bullet. The ability to deform a projectile affords the ability to spread its impact force over a larger portion of the outer layer 102. Protective helmet 100 can absorb the energy from the deformed projectile, bringing it to a complete stop or at least reducing its speed before it can completely penetrate the outer layer 102. The connectors 106 can reduce or eliminate the amount of force transferred to the head of a user. Inner layer 104 can also be made of such high force resistance material.

Inner layer 104 can be formed of a single shell of rigid or flexible material or can have multiple layers or zones of the same or different material. Inner layer 104 can include a rigid outer surface secured to the connectors 106 and a soft inner surface conforming to the head of a user. The inner surface of inner layer 104 may also include additional sizing layers, members or elements so as to afford a customized fit for a given user. Preferably, when inner layer 104 is a flexible material it can deform in a plane that is approximately 90° perpendicular to the direction of impact force 108 and inwardly as viewed from the center of the protective helmet 100 such that the inner layer 104 elongates in the direction of impact force 108. When inner layer 104 is a flexible material and deforms inwardly in a plane that is approximately 90° perpendicular to the direction of impact force 108, the connectors 106 disposed within or near the plane thus serve to absorb more of the force of impact that they would if the inner layer 104 did not flex inwardly.

As shown in FIG. 4, outer layer 102 can include a padding member 126 on an inner surface 128. Padding member 126 can be in the form of a layer, matrix of material or a multitude of individual members.

As shown in FIG. 4, inner layer 104 can include a padding member 130 on an outer surface 132. Padding member 130 can be in the form of a layer, matrix of material or a multitude of individual members.

The distances between outer surface 132 of inner layer 104 and inner surface of outer layer 102 can be the same for the entire protective helmet 100. These distances can also be different for different regions of the helmet, including but not limited to, the front portions, rear portions, top portion and side portions.

The distances between the outer layer 102 and 104 and or the connectors 106, (including number, size, shape, location, amount of tension and type of material) can be altered for specific applications. For example, for construction environments, it may be preferable to have a greater distance between the outer layer 102 and inner layer 104 at the top region of protective helmet 100, which such distance is greater than would otherwise be desirable for other applications; and further to have stronger connectors 106 along the sides of the protective helmet 100. Moreover, even within a general application, such for football helmets, the distances between the outer layer 102 and inner layer 104 and or the connectors 106 (including number, size, shape, location, amount of tension and type of material) can be altered for specific players or positions. For example, it may be preferable to have a greater distance between the layers for the back of a helmet used for a quarterback, who may often be forced to fall backwards.

Padding members 126 and 130 can both be included. Padding members 126 and 130 can be oriented to contact to each other at a state of rest and/or to contact each other only under some impact force. Padding members 126 and 130 can be oriented to not contact at a state of rest and/or to not contact even under some impact force.

Preferably for certain environments, the inner layer 104 and the outer layer 102 are designed so as to afford an airflow to reduce what would otherwise be an undesirably high internal temperature of the protective helmet 100. Protective helmet 100 can include a cooling member 134, as shown in FIG. 4.

Preferably for certain environments, the inner layer 104 and the outer layer 102 are designed so as to afford a higher temperature than would otherwise be an undesirably low internal temperature of the protective helmet 100. Protective helmet 100 can include a heating member 136.

Preferably, protective helmet 100 can include a communication device 138. Communication device 108 can include one directional, bi-directional or multi-directional communications, including voice and visual communication. Communication device 138 could afford communication between a user of protective helmet 100 to any other person, such as another player, a coach or a commander.

Communication device 138 can be connected to a display 140. Display 140 can display any information or image, whether stored or communicated in real time.

The materials used for protective helmet 100 may differ depending upon the specific application. For example, protective helmet 100 as used for firefighters may require the use of more heat resistant materials that may in turn be heavier and or more costly than would be desirable for other applications.

In certain applications, the protective helmet 100 can include one or more motion sensors or accelerometers 142. Preferably, motion sensor 142 is connected to protective helmet 100 to detect movement occurring to or relative to the rear portions and or to the sides of protective helmet 100. Motion sensor 142 can be connected to display 140 and or communication device 138.

In certain applications, the protective helmet 100 can include a camera 144. Camera 144 can be connected to display 140 and or communication device 138. One or more cameras 144 can be mounted on protective helmet 100. Camera 144 can display a rear view to a user via display 140.

As shown in FIG. 5, protective helmet 100 can include one or more adjustors 146. Adjustor 146 allows for the increase and/or decrease in the amount of tension of one or more connectors 106. Adjustor 146 may also allow for a change in position of one or more connectors 106. Adjustor 146 can be formed of a threaded portion 152 having a channel 154 and a moveable portion 156. Moveable portion 156 can be adjusted so as to move a connector 106 through channel 154. Preferably, adjustor 146 is flush with the outer surface of outer layer 102.

Motion sensor 142 can be used to detect the speed, size, orientation and/or direction of impact of an incoming force 108. This information can be communicated to communication device 138 and/or to display 140. A light, signal or communication can be generated in advance, during and or after an impact so as to indicate an impending, ongoing or recent impact. Such a communication can also indicate whether an undesirable threshold has been exceeded so as to remove a player and/or to inspect protective helmet 100. Preferably, this information can be communicated to one or more adjustors 146 that can adjust connectors 106 in accordance with the information so as to maximize the amount of protection afforded by protective helmet 100. For example, if a small, fast moving object (e.g. a bullet) is detected, motion sensor 142 can detect the object communicate the information to the dynamic response system, which may include software, and cause adjustments in the connectors prior to and/or during impact so as to maximize force-absorption and minimize injury. Such a response may include increasing the tension on some or all of the connectors. This dynamic impact response system has many useful applications, including in military applications. Likewise, if a larger, slower moving object is detected the dynamic response system can respond accordingly, such as possibly by lessening the tension on some or all of the connectors. In certain scenarios, it may be desirable to increase the tension on some connectors and decrease the tension on others. This dynamic impact response system can be installed within protective helmet 100 and can be monitored and/or controlled locally or remotely by a local or remote computer. In addition, the impact information can be stored. The impact information can include the movement of connectors 106, outer layer 102 and inner layer 104. By assessing the information gathered, an angle of approach of force 108 may be determined. This angle is useful in detecting the location and source of the force 108, e.g., for determining the location of a sniper. The dynamic impact response system can include air bags or other explosive devices that can be responsively deployable and directionally targeted to an incoming projectile so as to counter, at least in part, the force of such projectile. The air bag itself can be made of high force resistance material, including materials used in protective vests, including layers of very strong fiber (e.g., Kevlar) used to slow and deform a projectile, such as a bullet.

Protective helmet 100 may also include sensors that monitor the acceleration and/or change in momentum and can communicate same to the dynamic impact response system. In this embodiment, protective helmet 100 communicates in real time and can be used in various applications, including boxing matches. In the boxing match application, a method for monitoring punch hits and force can be employed wherein the helmet monitors hits and force, communicates same to a computer, analysis of the information is performed and a report is communicated to a non-participant for observation and/or scoring purposes. In addition, the method can include determining whether the observed number and or amount of force experienced meets a certain predetermine value such that the match should be discontinued and or to declare a victor. Protective helmet 100 can respond in real time to an incoming impact force 108 by using sensors that communicate to connectors 106 to cause adjustments thereto. A power source, preferably one or more batteries, can be used and secured to protective helmet 100 and operably connected to the various preferred components disclosed herein through one or more electrical circuits as understood by one of skill in the art.

The dynamic impact response system can include a gyroscope to measure and/or maintain orientation of the protective helmet 100 and/or one or more of the layers. Flexible electronics can be used to connect the components of the dynamic impact response system. Microprocessors can be used to detect and control signaling. Light and/or sound indicators can be included to alert a user or an observer.

As shown in FIG. 5, protective helmet 100 may include a right side portion 148 and a left side portion 150. Right side portion 148 can be disposed over the right side of the head of a user. Left side portion 150 can be disposed over the left side of the head of a user. For certain applications, for example, where protective helmet 100 is used as a batting helmet for baseball, only one of the side portions 148 and 150 may be included. The inner layer 104 may include one or more openings 158 around the ear of the user.

In one embodiment, outer layer 102 can envelop most of the head of the user, including the top, sides, front and back of the head of a user; and inner layer 104 can envelop most of the head of the user, including the top, sides, front and back of the head of a user. The portion of inner layer 104 that extends over the face of a user can include multiple connectors 106 to improve the performance of the protective helmet 100 from rear impacts. In this embodiment, the front portions of both the outer layer 102 and the inner layer 104 are transparent. In another embodiment, one or more of the layers envelop less than most of the head of the user. In an embodiment of the present invention as used for a soccer player, the outer layer 102 and the inner layer 104 are generally circular with upper and lower openings such that the top of the head is not protected by the helmet, but the sides of the head are protected against impact forces, such as the forces caused by colliding with another soccer player.

Prototype Test Results. Certain springs for a prototype were obtained from Lee Spring, Inc. Part Number LE 026B 01 M, Outside Diameter 0.188 inches; Wire Diameter 0.026 inches; Maximum Load 4.300 lb; Free Length 1.000 in; Rate 6.10 lb/in; Maximum Length 1.620 in; Initial Tension 0.500 lb; Material MW (music wire); Total Coils 26.4; Number of Coils 26.4; Finish ZINC PLATE AND BAKE PER ASTM B633. The outer layer of the prototype was a racing helmet and the inner layer was a child's batting helmet. The original padding of each was removed. Holes were drilled in the outer helmet and eye-hooks were screwed into the inner helmet. Extension springs were connected to the eye-hooks, extended and pulled through the holes in the outer helmet and secured in place by bolts disposed perpendicular to the longitudinal axis of the springs. A youth lacrosse shoulder pad was used as the padding for the inner helmet. A football helmet chin strap was used and was secured to the inner helmet. There were 24 extension springs used, each being under tension along their longitudinal axis. The helmet was tested at Wayne State University and outperformed a Riddell Revolution football helmet and a COTS Simpson NASCAR helmet (model: 8707141 SNS, size: 7¼) in certain categories. The helmets were tested using a Hybrid III ATD head and neck mounted to a linear trolley system. The head form was instrumented with three linear accelerometers, three angular rate sensors, and a 6-axis upper neck load cell. This instrumentation is capable of providing linear and angular acceleration data, as well as forces and moments in the upper neck of the Hybrid III. 8-channel SIMs and (DTS, Seal Beach, Calif.). The data were subsequently downloaded using TDAS control software. After testing, post-processing of the data was conducted using National Instruments DIAdem 2010, National Instruments (Austin, Tex.). Data processing included data filtering according to SAE J211-1, calculation of resultant head acceleration, head angular velocity, neck force, and neck moment. DIAdem crash analysis and mathematical functions were used to calculate Severity Index (SI), Head Injury Criterion (HIC), and peak angular acceleration. Five criteria were used to evaluate the severity of each impact: Head Injury Criteria (HIC), Severity Index (SI), Peak Angular Acceleration, Peak Resultant Upper Neck Load, and Peak Resultant Upper Neck Moment. For each of these criteria, as the value increases the risk of injury increases. After data processing, results were organized by each of the three impact locations and compared by the products tested. The prototype had lower values than the NASCAR helmet in the following categories: HIC in two impact locations (i.e. Side Impact Condition and Rear Impact Condition); SI in two of the impact locations (i.e. Side Impact Condition and Rear Impact Condition); Peak Angular Acceleration in all three impact locations; Upper Neck Load in the Side Impact Condition; and Upper Neck Moment in all three impact locations (i.e. Front Impact Condition, Side Impact Condition and Rear Impact Condition). In addition, the prototype had lower values than the football helmet in the following categories: Peak Angular Acceleration in the front impact location; and Upper Neck Load and Upper Neck Moment in all three impact locations (i.e. Front Impact Condition, Side Impact Condition and Rear Impact Condition).

Figure 7:
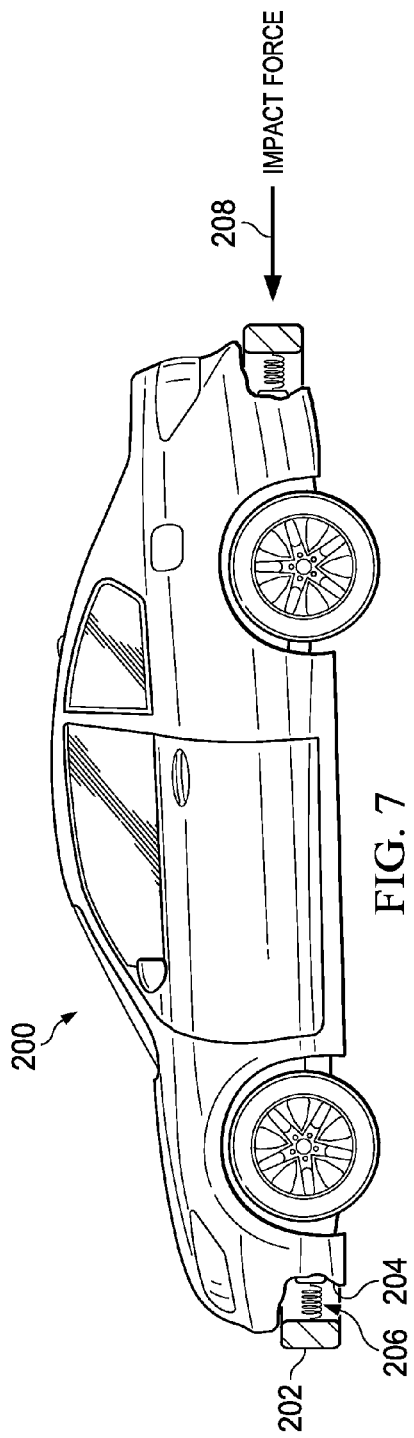
FIG. 7 is a cross-sectional view of a protective helmet according to the present invention as applied to automotive bumpers.

FIG. 7 depicts a protective member according to the present invention as applied to an automotive bumper 200. The bumper 200 includes an outer layer 202 and an inner layer 204 connected by multiple connectors 206, preferably comprising extension springs. The connectors 206 have a longitudinal axis being under tension along said longitudinal axis so as to absorb energy from an impact force 208 (e.g. from another vehicle or object) by resisting further tension along said longitudinal axis. During an impact, outer layer 202 and inner layer 204 are allowed to move relative to each other and reduce the amount of force from said impact that is transferred to the vehicle or automobile, thus reducing the amount impact force reaching the passenger or cargo. An impact to the front of the bumper 200 will be absorbed at least in part by the connectors 206 on the back of the bumper 200 and vice versa. In this way, the force of impact is transferred to the opposite side of the impact. Moreover, in the scenario in which an automobile is moving, during an impact the inner layer 204 is allowed to continue moving at least through part of the distance between the inner layer 204 and the outer layer 202 so as to decrease the rate of deceleration experienced by the passenger or cargo. In the scenario in which an automobile is stationary, during an impact the outer layer 202 is allowed to continue moving at least through part of the distance between the inner layer 204 and the outer layer 202 so as to decrease the amount of force experienced by the passenger or cargo. Bumper 200 may include connectors 206 in the front and back, or in relatively 360 degrees orientation. Bumper 200 may also be disposed to include connectors 206 only on the sides of the vehicle. A given vehicle can be configured to include one or more bumpers 200. For example, a front/back bumper can be used with a side/side bumper. In addition, bumper 200 can include nested layers, such as one or more additional outer or inner layers with their own connectors 206. Such a configuration can afford additional force absorption and also stepped force absorption, i.e. absorption that is greater than or less than the force absorption afforded by the first or outermost wave of connectors 206. Bumper 200 can be connected to the dynamic response system which can communicate impacts, including to a system that adjusts the amount of tension on connectors 206, adjusts the speed and positioning of the car and or deploys various safety mechanisms, such as air bags. In these embodiments, a force 208 can be managed while affording some continued movement of the passenger or cargo to decrease the rate of deceleration experienced. Connectors 206 may also be adjustable such that the amount of tension is adjusted depending upon the speed of the vehicle or the perceived speed of an approaching force 208. After an impact, inner and outer layers preferably return to the original relative orientation.

Figure 8:
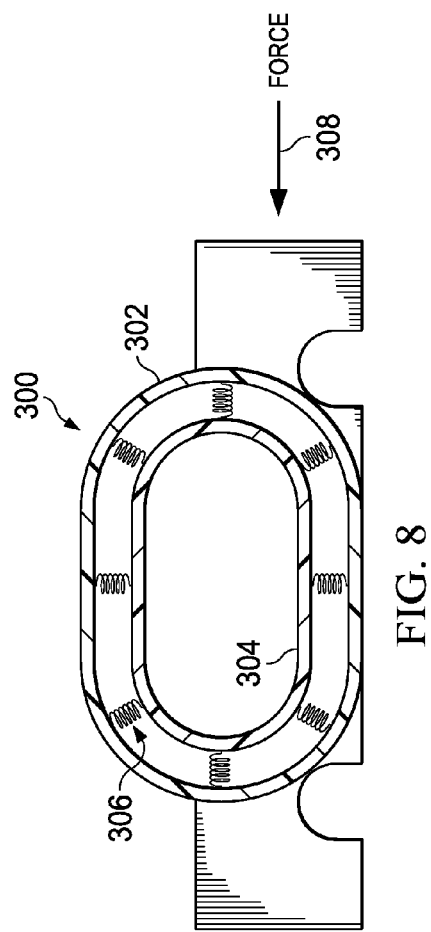
FIG. 8 is a cross-sectional view of a protective helmet according to the present invention as applied to a passenger cabin.

FIG. 8 is a cross-sectional view of a protective member according to the present invention as applied to a passenger cabin 300. Cabin 300 includes an outer layer 302 and an inner layer 304 connected by multiple connectors 306, preferably comprising extension springs. The connectors 306 have a longitudinal axis being under tension along said longitudinal axis so as to absorb energy from an impact force 308 (e.g. from another vehicle or object) by resisting further tension along their longitudinal axis. During an impact, outer layer 302 and inner layer 304 are allowed to move relative to each other and reduce the amount of force from said impact that is transferred to the cabin, thus reducing the amount impact force reaching the passenger and or cargo. An impact to the front of the cabin 300 will be absorbed at least in part by the connectors 306 on the back of the cabin 300 and vice versa. In this way, the force of impact is transferred to the opposite side of the impact. Moreover, in the scenario in which an automobile is moving, during an impact the inner layer 304 is allowed to continue moving at least through part of the distance between the inner layer 304 and the outer layer 302 so as to decrease the rate of deceleration experienced by the passenger or cargo. In the scenario in which an automobile is stationary, during an impact the outer layer 302 is allowed to continue moving at least through part of the distance between the inner layer 304 and the outer layer 302 so as to decrease the amount of force experienced by the passenger or cargo. Cabin 300 may include connectors 306 in the front and back, or in relatively 360 degrees or omni-directional orientations. The longitudinal axis of the connectors are preferably oriented such that a line extending from the longitudinal axis would pass through the center of the Cabin 300. Cabin 300 may also be disposed to include connectors 306 only on the sides of the vehicle. Cabin 300 can also include connectors in the top or bottom areas so as to absorb forces caused by road conditions. A given vehicle can be configured to include one or more cabins 300. For example, a cabin 300 may be used for each passenger. In addition, cabin 300 can include nested layers, such as one or more additional outer or inner layers with their own connectors 306. Such a configuration can afford additional force absorption and also stepped force absorption, i.e. absorption that is greater than or less than the force absorption afforded by the first or outermost wave of connectors 306. Cabin 300 can be connected to the dynamic response system which can communicate impacts, including to a system that adjusts the amount of tension on connectors 306, adjusts the speed and positioning of the car and or deploys various safety mechanisms, such as air bags. In these embodiments, a force 308 can be managed while affording some continued movement of the passenger or cargo to decrease the rate of deceleration experienced. Connectors 306 may also be adjustable such that the amount of tension is adjusted depending upon the speed of the vehicle or the perceived speed of an approaching force 308 or of perceived road conditions. After an impact, inner and outer layers preferably return to the original relative orientation. Cabin 300 can also be used in other applications such as for an airplane or motorcycle.

Figure 9:
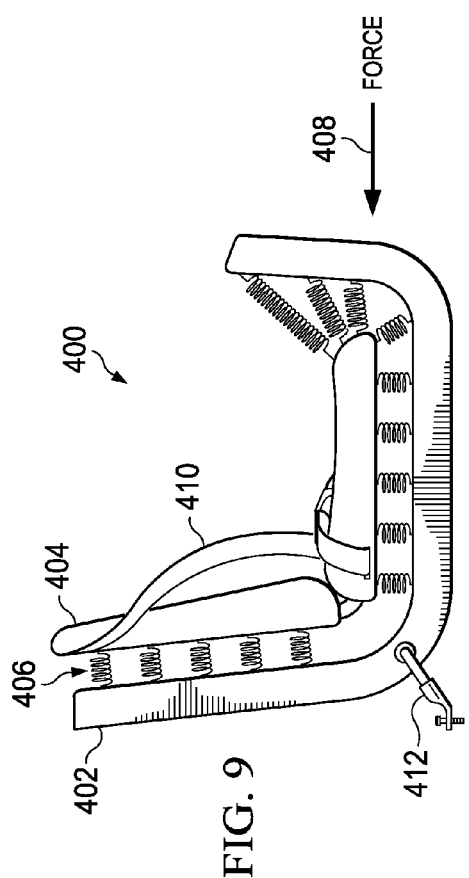
FIG. 9 is a cross-sectional view of a protective helmet according to the present invention as applied to a car seat.

FIG. 9 is a cross-sectional view of a protective member according to the present invention as applied to a car seat 400. Car seat 400 includes an outer layer 402 and an inner layer 404 connected by multiple connectors 406, preferably comprising extension springs. Outer layer 402 and inner layer 404 preferably envelope the user as much as feasible to afford omni-directional force absorption. The goal of omni-directional force absorption can also be accomplished by adjusting the angles of various connectors. The outer layer 402 is preferably rigidly secured to the seat of a car such as by traditional locking members connected to the seat frame. Inner layer 404 is thus allowed to move relative to outer layer 402 and to the car with force absorption being performed by the connectors 406. The connectors 406 have a longitudinal axis being under tension along said longitudinal axis so as to absorb energy from an impact force 408 (e.g. from another vehicle or object) by resisting further tension along their longitudinal axis. A child can be secured to inner layer 404 by straps 410. Outer layer 402 can be secured to a seat of a car by anchors 412. During an impact, outer layer 402 and inner layer 404 are allowed to move relative to each other and reduce the amount of force from said impact that is transferred to the child, thus reducing the amount impact force reaching the child or infant. An impact to the front of a vehicle containing the car seat 400 will be absorbed at least in part by the connectors 406 on the back of the car seat 400 and vice versa. In this way, the force of impact is transferred to the opposite side of the impact. Moreover, in the scenario in which an automobile is moving forward and encounters a head-on force, during impact the inner layer 404 is allowed to continue moving at least through part of the distance between the inner layer 404 and the outer layer 402 so as to decrease the rate of deceleration experienced by the infant, child or other passenger. In the scenario in which an automobile is stationary and encounters an impact, during impact the outer layer 402 is allowed to continue moving at least through part of the distance between the inner layer 404 and the outer layer 402 so as to decrease the amount of force experienced by the passenger. Car seat 400 may include connectors 406 in the front and back, or in relatively 360 degrees or omni-directional orientations. Car seat 400 may also be disposed to include connectors 406 only on the sides of the car seat. Car seat 400 can also include connectors in the top or bottom areas so as to absorb forces caused by road conditions. In addition, car seat 400 can include nested layers, such as one or more additional inner or outer layers with their own connectors 406. Such a configuration can afford additional force absorption and also stepped force absorption, i.e. absorption that is greater than or less than the force absorption afforded by the first or outermost wave of connectors 406. Car seat 400 can also include tethers between layers that are not under tension but that are engaged so as to limit the relative travel of the layers. Car seat 400 can be connected to the dynamic response system which can communicate impacts, including to a system that adjusts the tension on connectors 406 and or deploys various safety mechanisms, such as air bags. In these embodiments, a force 408 can be managed while affording some continued movement of the infant or child to decrease the rate of deceleration experienced. Connectors 406 may also be adjustable such that the amount of tension is adjusted depending upon the speed of the vehicle or the perceived speed of an approaching force 408 or of perceived road conditions. After an impact, inner and outer layers preferably return to the original relative orientation.

Figure 10:
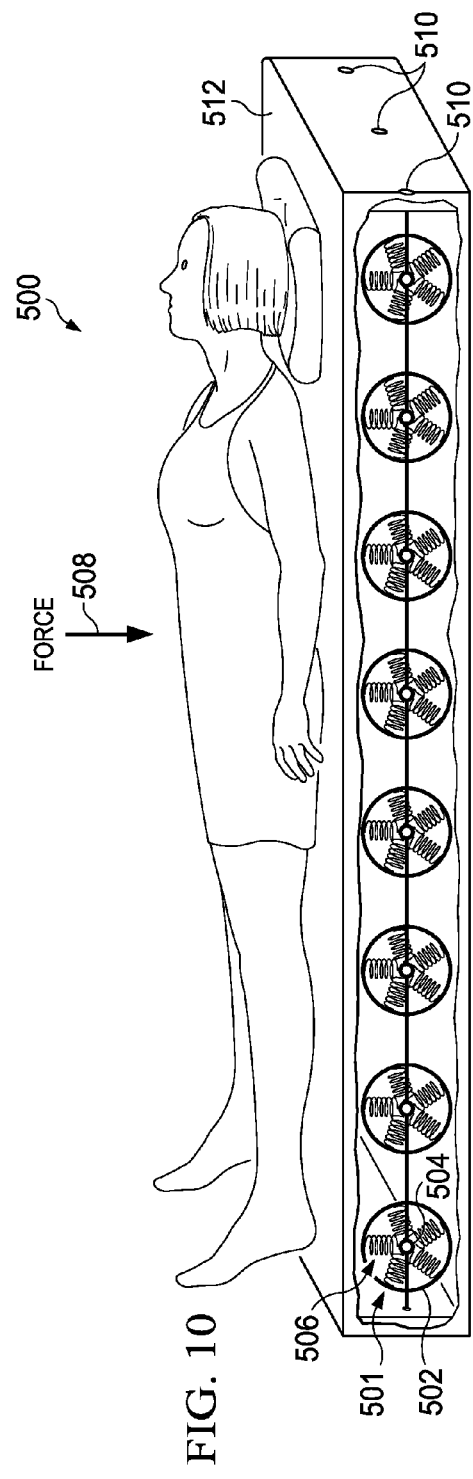
FIG. 10 is a cross-sectional view of a protective helmet according to the present invention as applied to a bed.

FIG. 10 is a depiction of a protective member according to the present invention as applied to a bed 500. Bed 500 includes one or more force absorption members 501 having an outer layer 502, an inner layer 504 and connectors 506. The connectors 506 have a longitudinal axis and are under tension along their longitudinal axis. Connectors 506 can be extension springs. Members 501 afford relative movement between outer layer 502 and inner layer 504. Bed 500 can absorb a force 508 of a user, including as a result of the weight of the body of a person sleeping on bed 500. The multiple members 501 can be connected to a support member (e.g. horizontal bar) 510 that extends through the members 501, preferably through the center of the inner layer 504 rigidly supporting the member 501 but allowing relative movement of outer layer 502 so as to absorb the weight of a user as a result of further tension being placed on the connectors opposite the side of the user, i.e. closer to the floor. In this configuration, the weight of a user is absorbed by the connectors on the opposite side of the user, i.e. towards to floor. Thus, the weight of the user causes outer layer 502 to move towards the floor whereas the inner layer 504 remains relatively fixed in relation to the floor. When the user leaves, outer layer 502 preferably returns to its original orientation relative to inner layer 504. A preferred configuration of bed 500 affords multiple members 501 disposed such that the longitudinal axis of the connectors 506 are perpendicular to the longitudinal axis of the horizontally disposed bar 510. Members 501 are preferably configured so as to afford various zones of differing firmness. Upon the user leaving bed 500, the connectors preferably return outer layer 502 to its original orientation relative to inner layer 504. The cross-sections of the members 501 can be of any shape including circular, oval, square or rectangular and include one or more connectors in both the upper and lower hemispheres. Horizontal bar 510 preferably affords adjustability to the tension of connectors 506. Multiple horizontally disposed bars 510 can be used, each containing one more force absorption members 501. Bed 500 can allow adjustment to connectors 506 depending upon the weight and size of the user and or sleep patterns. The connectors 506 can have varying tension depending on the zone and can be adjustable and replaceable. Bed 500 can include multiple layers of members 501, which can appear in a single layer or can replace one or more of the traditional layers: mattress or box spring (which comprise compression springs). In addition, bed 500 can include nested layers, such as one or more additional inner or outer layers within one or more of the members 501 that include their own connectors 506. Such a configuration can afford additional force absorption and also stepped force absorption, i.e. absorption that is greater than or less than the force absorption afforded by the first or outermost wave of connectors 506. For example, the outermost wave of connectors can be configured to absorb a few pounds of force along a slight distance whereas a first inner wave of connectors can be configured to absorb a much greater amount of force over a longer distance; or vice versa. In one scenario, the first wave is fully engaged and reaches a force absorption stopping point before the second wave is engaged. Traditional bedding layers 512 can also be included, such as a cushion or foam layer on top of the bed 500. The number and positioning of members 501 can be varied based upon the size of the bed, user preference, number of sleepers, the number of connectors, orientation of connectors, the properties of the connectors 506 and the amount of tension on connectors 506. The upper most shape of the outer layer 502 can be flat or curved. Moreover, one or more horizontal bars 510 can be used in parallel, angled and or perpendicular orientation to each other and or the user. In addition, bed 500 can be coupled to a computer containing software that receives inputs, such as the height and weight of a user, that then causes adjustments to the members 501 that are tailored to a given user. An additional advantage of the present invention is the ability to restore the individual outer layers 502 to their original orientation relative to inner layers 504 so as to avoid the sagging that occurs in traditional beds over time. Moreover, should any of the connectors 506 lose their ability to regain their original orientation over time, they can be replaced or the individual member 501 can be rotated such that the connectors bearing most of the load are moved out of the most load bearing area. For example, as an individual user contacts the upper portion of a member 501, the impact force first engages the upper portion of outer layer 502, the impact force is transferred through the outer layer 502 to the lower side of member 501 and the lower portion of outer layer 502 moves down and away from the lower portion of inner layer 504 such that connectors 506 in the lower portion are elongated and therefore serve to absorb the force of impact.

Torso Protective Member.

Figure 11A:
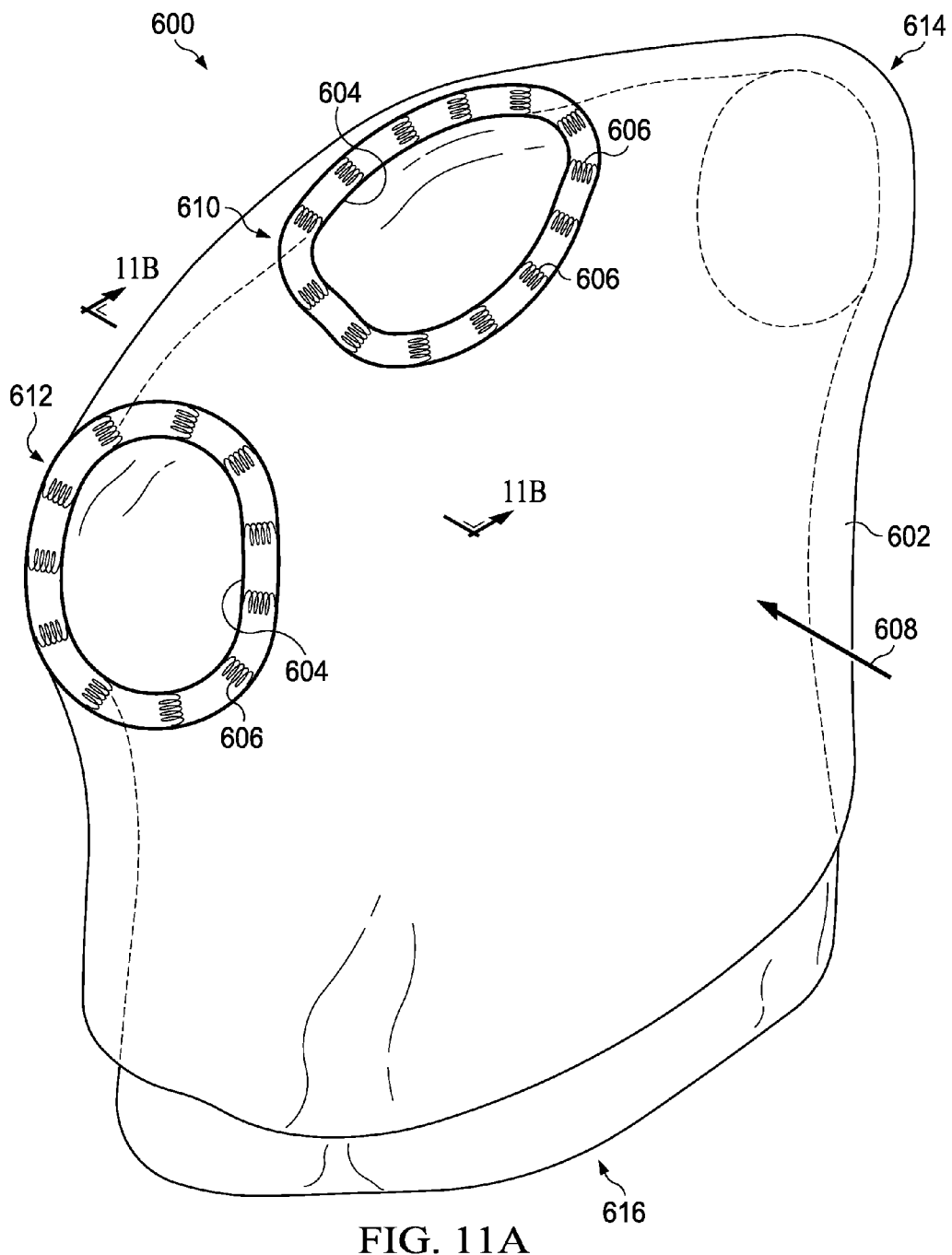
FIG. 11A is a depiction of a protective member according to the present invention as applied to a torso.

FIG. 11A is a depiction of a protective member according to the present invention as applied to a human torso. Protective member 600 includes an outer layer 602, an inner layer 604 and connectors 606. The connectors 606 have a longitudinal axis and are under tension along their longitudinal axis. Connectors 606 can be extension springs. The protective member 600 is configured so as to afford relative movement between outer layer 602 and inner layer 604. Outer layer 602 can absorb a force 608, including a force caused by blunt force (e.g. a baseball or another sports player) or by another projectile such as a bullet or bomb fragment. As an external force 608 reaches outer layer 602, connectors 606 generally on the opposite side of protective member 600 are subjected to a greater tension force and exhibit elongation along their longitudinal axis. As such connectors 606 resist such elongation, they absorb the impact forces. For example, as protective member 600 is impacted in the front by a bullet, the impact force first engages the front side of outer layer 602, the impact force is transferred through the outer layer 602 to the back side of protective member 600 and the back side of outer layer 602 moves backwards and away from the back side of inner layer 604 such that connectors 606 in the back side are elongated and therefore serve to absorb the force of impact. After the force is absorbed, the connectors 606 seek to regain their original orientation. Protective member 600 serves to reduce the amount of force from an impact that is transferred to the torso of a user, thus reducing the amount impact force reaching the user. In addition, the movement of outer layer 602 relative to inner layer 604 reduces the amount of movement, including rotational movement, of the torso of a user that would otherwise occur from an impact. Outer layer 602 can be made of any standard material useful to absorb impacts, including padding, body armor, bullet proof vests or materials used by bomb removal personnel. Outer layer 602 can also be placed under such existing materials. Outer layer 602 and inner layer 604 include an neck opening 610, a first arm opening 612, a second arm opening 614 and a lower torso opening 616. Protective member 600 can be worn by personnel desiring impact protection including sports players (e.g. football players, baseball catchers) and military personnel. Protective member 600 can envelop the entire torso of a user or a portion thereof. Protective members 600 can also be tailored to protect the arms and legs of a user. A scanner can be used to scan the torso of a user. The scanner can be coupled to a 3-D printer to produce a customized Protective Member 600 for the specific user's torso. Connectors 606 can be selected based upon various inputs, including the weight, height and type of activity of the user. Protective member 600 can be comprised of numerous connectable parts or sections to as to afford ease of use by a user in putting on and taking off the protective member 600.

Figure 11B:
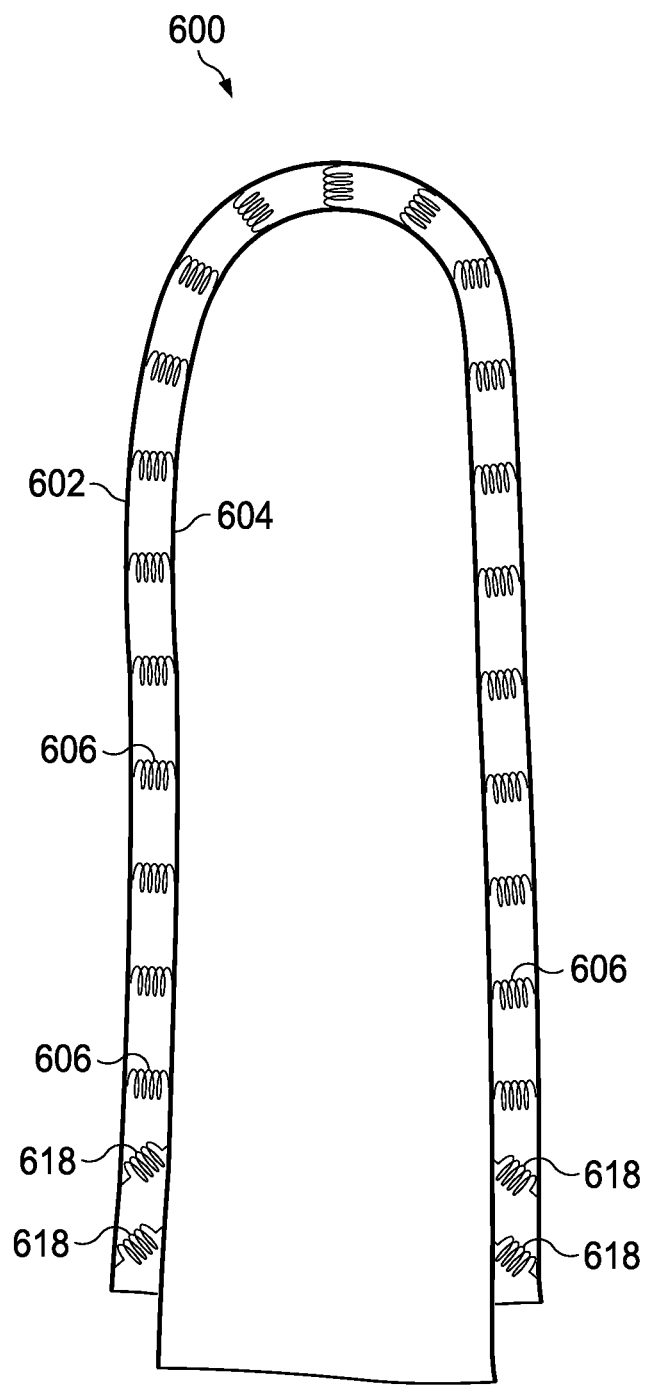
FIG. 11B is a cross-sectional view of FIG. 11A.

FIG. 11B is a cross-sectional view of the torso protective member 600 depicting the outer layer 602 connected to the inner layer 604 by connectors 606. Preferably, torso protective member 600 includes weight offset connectors 618 that serve to support the weight of the outer layer 602. Weight offset connectors 618 are preferably connected at approximately a 45 degree angle to the outer layer 602 and or the inner layer 604. Weight offset connectors 618 have a longitudinal axis and are under tension along their longitudinal axis. Connectors 618 can be extension springs. Connectors 618 are configured so as to absorb a force 608, directed downward from the top of torso protective member 600 while allowing outer layer 602 to move downward relative to inner layer 604 that is generally fixed to the torso of a user. Thus, torso protective member 600 serves to absorb force 608. Protective member 600 can also be expanded to envelop the entire torso, including the lower torso: in which case each layer has a first leg opening and a second leg opening. Protective member 600 can also be limited to the lower torso regions: in which case each layer includes and upper opening for receipt of the mid torso region and each layer includes a first leg opening and a second leg opening.

Hand Protective Member.

Figure 12:
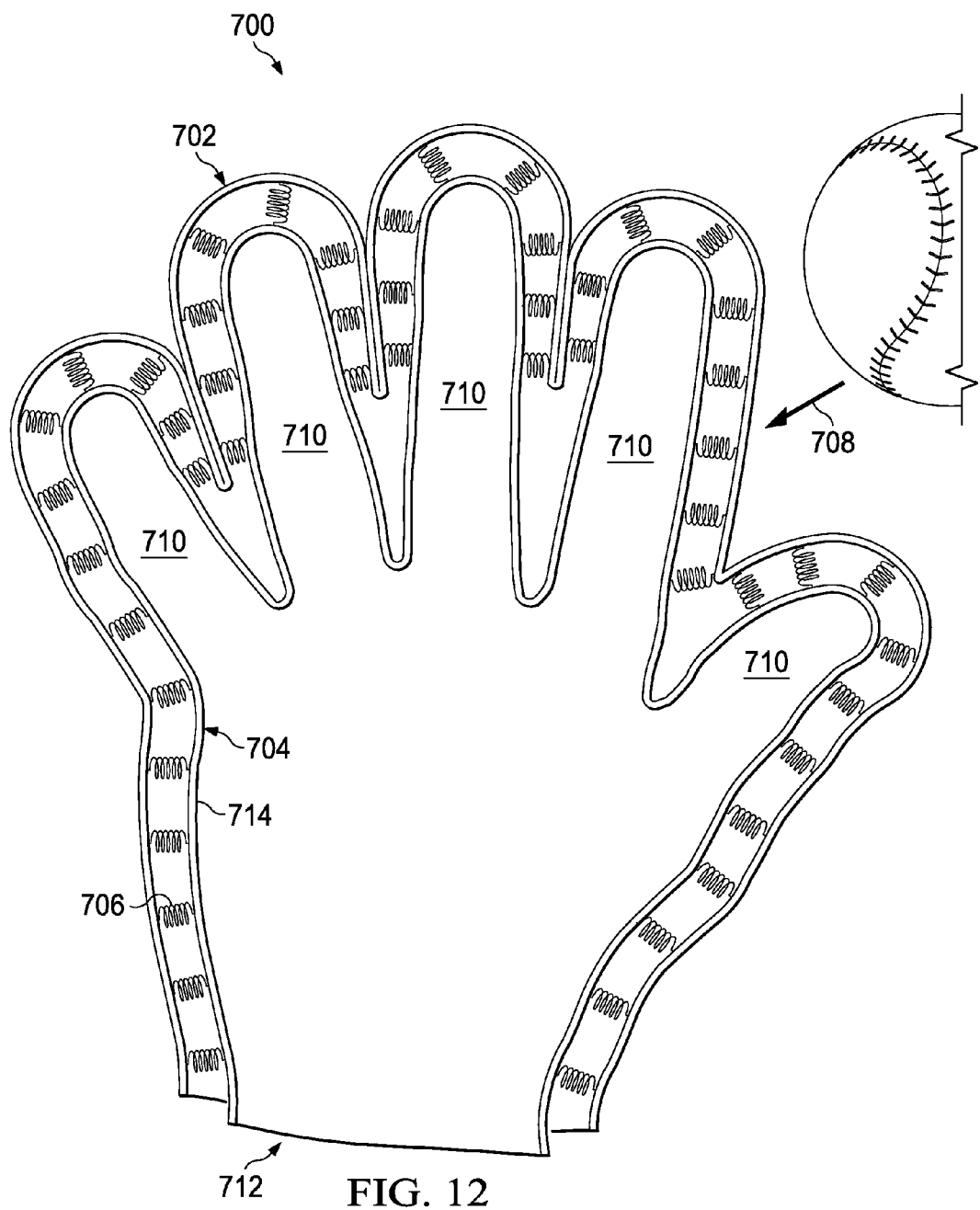
FIG. 12 is a cross-sectional view of a protective member according to the present invention as applied to a glove.

FIG. 12 is a protective member according to the present invention as applied to a glove. Protective member 700 includes an outer layer 702, an inner layer 704 and connectors 706. The connectors 706 have a longitudinal axis and are under tension along their longitudinal axis. Connectors 706 can be extension springs. The Protective Member 700 is configured so as to afford relative movement between outer layer 702 and inner layer 704. Outer layer 702 can absorb a force 708, including a force caused by ball such as a baseball. As an external force 708 reaches outer layer 702, connectors 706 generally on the opposite side of protective member 700 are subjected to a greater tension force and exhibit elongation along their longitudinal axis. As such connectors 706 resist such elongation, they absorb the impact forces. For example, as protective member 700 catches a ball, the impact force first engages the front side of outer layer 702, the impact force is transferred through the outer layer 702 to the back side of protective member 700 and the back side of outer layer 702 moves backwards and away from the back side of inner layer 704 such that connectors 706 in the back side are elongated and therefore serve to absorb the force of impact. After the force is absorbed, the connectors 706 seek to regain their original orientation. Protective Member 700 serves to reduce the amount of force from an impact that is transferred to the hand of a user, thus reducing the amount impact force reaching the user. In addition, the movement of outer layer 702 relative to inner layer 704 reduces the amount of movement, including rotational movement, of the hand of a user that would otherwise occur from an impact. Outer layer 702 can be made of any standard material useful to absorb impacts, including padding or other conventional baseball glove material. Outer layer 702 can also be placed under such existing materials. Inner layer 704 preferably includes chambers 710 that conform to the fingers of a human hand and an opening 712 for the wrist of a human hand. The interior surface 714 of inner layer 704 is preferably shaped to conform to the hand of a user. The glove can be used for any purpose including as a catcher's glove in baseball or for a goaltender in ice hockey. A scanner can be used to scan the hand of a user. Scanner can be coupled to a 3-D printer to produce a customized Protective Member 700 for the specific user's hand. Connectors 706 can be selected based upon various inputs, including the size and shape of the user's hand and the type of activity of the user.

Ship Protective Member.

Figure 13:
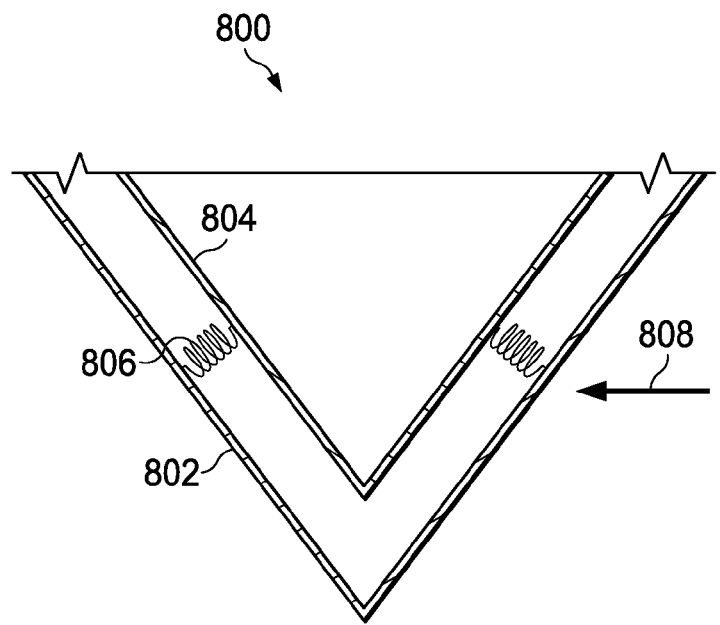
FIG. 13 is a cross-sectional view of a protective member according to the present invention as applied to a ship.
Figure 14:
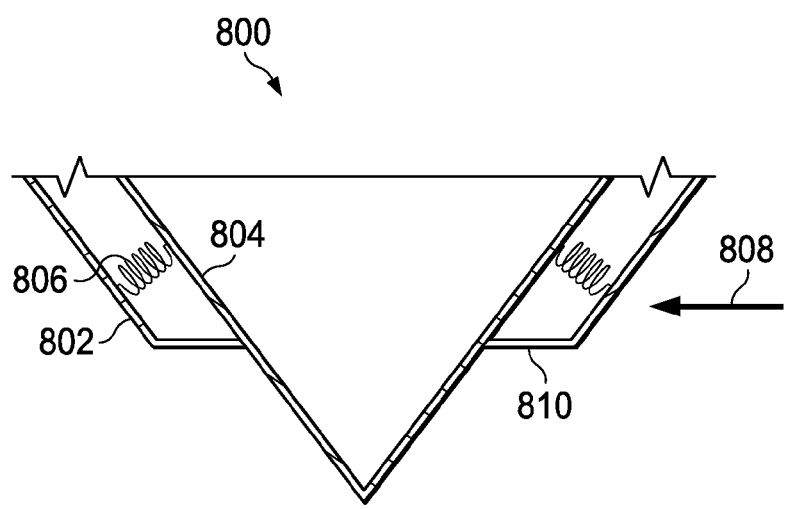
FIG. 14 is a cross-sectional view of a protective member according to another embodiment of the present invention as applied to a ship.

FIGS. 13 and 14 disclose a protective member according to the present invention as applied to a ship hulls. Ships often encounter impact forces, including from waves, piers or other vessels. To absorb such forces so as to minimize movement of the ship's cargo and passengers, the protective member of the present invention may be employed. Protective Member 800 includes an outer layer 802, an inner layer 804 and connectors 806. Inner layer 804 can be the existing outer hull of an existing ship. The connectors 806 have a longitudinal axis and are under tension along their longitudinal axis. Connectors 806 can be extension springs. Connectors 806 can be selected based upon the size, shape, port conditions, sea conditions, the type of wave movement to be addressed and amount of cargo for any given ship. The Protective Member 800 is configured so as to afford relative movement between outer layer 802 and inner layer 804. Outer layer 802 can absorb a force 808, including a force caused by impacts with an object such as a pier or other ship. As an external force 808 reaches outer layer 802, connectors 806 generally on the opposite side of protective member 800 are subjected to a greater tension force and exhibit elongation along their longitudinal axis. As such connectors 806 resist such elongation, they absorb the impact forces. After the force is absorbed, the connectors 806 seek to regain their original orientation. Protective Member 800 serves to reduce the amount of force from an impact that is transferred to the ship, thus reducing the amount impact force reaching the ship. In addition, the movement of outer layer 802 relative to inner layer 804 reduces the amount of movement, including rotational movement, of the ship that would otherwise occur from an impact. Outer layer 802 can be made of any standard material useful as a ship hull. Outer layer 802 can also be placed behind such existing materials. Protective Member 800 can also afford improved stability to the ship in that forces from waves can be absorbed by outer layer 802 and not transferred directly to ship cargo or passengers. Outer layer 802 could envelope inner layer 804 below the waterline as shown in FIG. 13 or could surround less than all of such area, such as only a portion of the hulls surface from the water line to about half-way down the hull, as shown in FIG. 14. In such a configuration outer layer 802 and inner layer 804 could be connected by a sealing ring 810 that prevents water from entering in between outer layer 802 and inner layer 804. Sealing ring 810 preferable does not interfere with the relative movement of outer layer 802 and inner layer 804.

Foot Protective Member.

Figure 15:
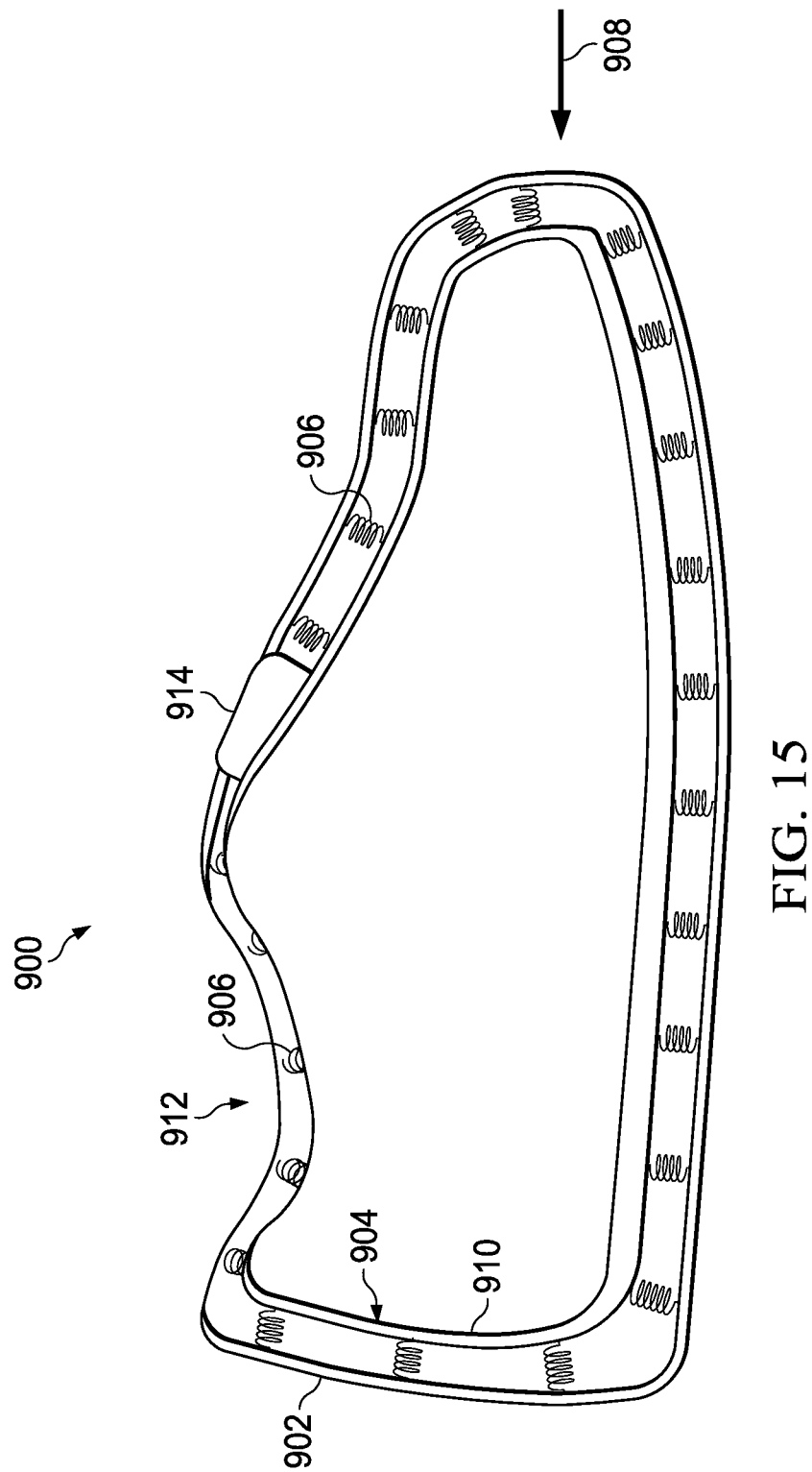
FIG. 15 is a cross-sectional view of a protective member according to the present invention as applied to footwear.

FIG. 15 is a protective member according to the present invention as applied to footwear such as a shoe. Protective member 900 includes an outer layer 902, an inner layer 904 and connectors 906. The connectors 906 have a longitudinal axis and are under tension along their longitudinal axis. Connectors 906 can be extension springs. The Protective Member 900 is configured so as to afford relative movement between outer layer 902 and inner layer 904. Outer layer 902 can absorb a force 908, including a force caused by impacts with the ground, such as during running or walking. As an external force 908 reaches outer layer 902, connectors 906 generally on the opposite side of protective member 900 are subjected to a greater tension force and exhibit elongation along their longitudinal axis. As such connectors 906 resist such elongation, they absorb the impact forces. For example, as protective member 900 impacts the ground, the impact force first engages the lower side of outer layer 902, the impact force is transferred through the outer layer 902 to the upper side of protective member 900 and the upper portion of outer layer 902 moves up and away from the upper portion of inner layer 904 such that connectors 906 in the upper portion are elongated and therefore serve to absorb the force of impact. After the force is absorbed, the connectors 906 seek to regain their original orientation. Protective member 900 serves to reduce the amount of force from an impact that is transferred to the foot of a user, thus reducing the amount impact force reaching the user. In addition, the movement of outer layer 902 relative to inner layer 904 reduces the amount of movement, including rotational movement, of the foot of a user that would otherwise occur from an impact. Outer layer 902 can be made of any standard material useful to absorb impacts, including padding or other conventional shoe material. Inner layer 904 preferably includes an inner surface 910 that conform to the foot of a user. Inner layer 904 and outer layer 902 include an opening 912 for receipt of a foot of a user. Preferably, connectors 906 are disposed around the sides of opening 912 and help to offset the weight of a user. Conventional securing elements 914 can be used with the inner layer 904 to secure protective member 900 to the foot of a user. A scanner can be used to scan the foot of a user. Scanner can be coupled to a 3-D printer to produce a customized protective member 900 for the specific user's foot. Connectors 906 can be selected based upon various inputs, including the weight, height and type of activity of the user.

Padding Replacement System and Method.

Figure 16:
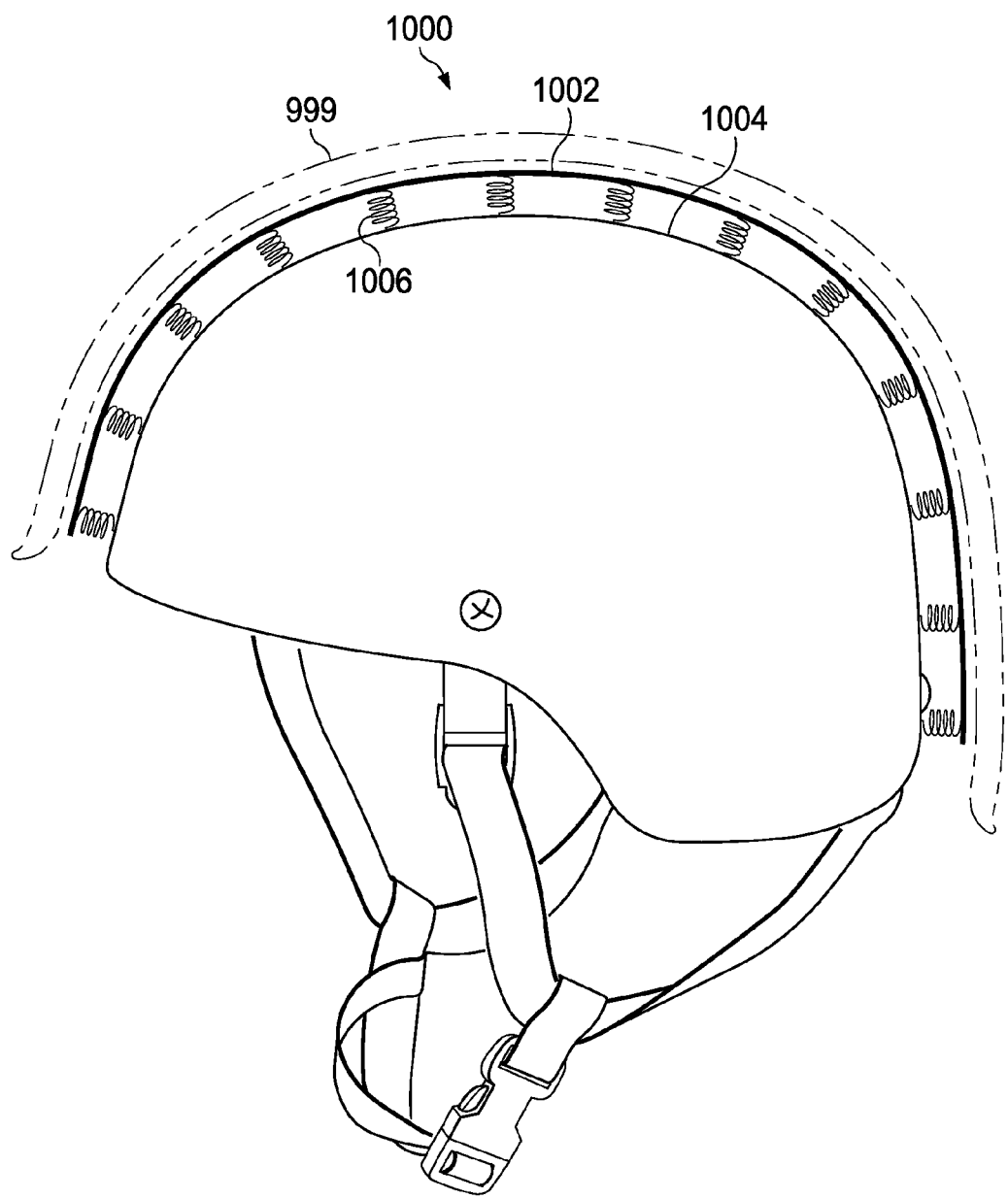
FIG. 16 is a cross-sectional view of the protective helmet system according to the present invention as useful to replace traditional padding in an existing combat helmet.

As shown in FIG. 16, the protective member of the present invention can be used as a padding replacement system 1000. An existing military helmet is shown as element 999, but not part of the present invention. The method of replacement includes the steps of removing the existing padding from an existing helmet (e.g. the padding connected by Velcro® inside the ACH), securing the outer layer 1002 of the protective member 1000 to the interior surface of the existing helmet. The inner layer 1004 is connected through a plurality of connectors 1006 that behave according to the connectors of the present invention). The outer layer 1002 and the inner layer 1004 are movable with respect to each other and absorb forces and reduce linear and angular acceleration according to the other embodiments of the present invention. Additional method steps can include securing a chin strap to the inner layer of the protective member. The outer layer 1002 of the protective member 1000 preferably conforms to the shape of the interior surface of existing military helmets. The method of using the padding replacement system 1000 includes removes the existing compression padding, placing the protective member in the interior of the existing helmet and securing the outer layer 1002 of the protective member 1000 to the inner surface of the existing helmet so that the inner layer 1004 of the protective member can move relative to the outer layer. The protective member 1000 absorbs impact energy from a force 1008, such as a projectile. Additional method steps include removing the existing neck or chin strap from the existing helmet and then reattaching the existing neck or chin strap to the inner layer 1004 and/or the outer layer 1002 of the protective member. Connecting the strap to the outer layer 1002 may afford greater stability to any helmet mounted gear; whereas connection the strap to the inner layer 1004 may afford greater protection to user from impact forces. The existing chin strap for the ACH is secured by four bolts. These existing four bolts can be used to secure the outer layer 1002 to the ACH helmet. Thus, additional method steps can include removing the four bolts of an existing ACH and securing the outer layer 1002 of the system to the ACH using attachments (e.g., the removed four bolts) placed through the same holes in the ACH previously occupied by the four bolts.

Scoring System.

The scoring system of the present inventions includes two or more accelerometers, one on outer layer 102 and one on inner layer 104. Data is collected from the accelerometers and analyzed. The analyzed data can be stored. The analyzed data can be communicated to the user and or to others. A score limit indicator can be used to indicate to a user or to another person such as a referee to determine when certain impact limits have been reached. Calculations can be made concerning the relative motions of the accelerometers so as to create a score measuring the severity and or type of impact received by the outer layer 102 and or the inner layer 104. This data can be used to assess the competitive environment and or the effectiveness of the protective member 100.

The protective helmet of the present invention can also include power and data cables removably connectable to mountable peripheral devices such as enhanced visions sensors, audio sensors, illumination devices, global positioning systems, and detectors. The detectors can be used to detect radiation, gases, chemicals, heat and/or light.

The protective helmet of the present invention can also include a neck protection attachment, a mandibular guard attachment, a visor attachment or other protection accessories.

Protective Member.

Figure 17:
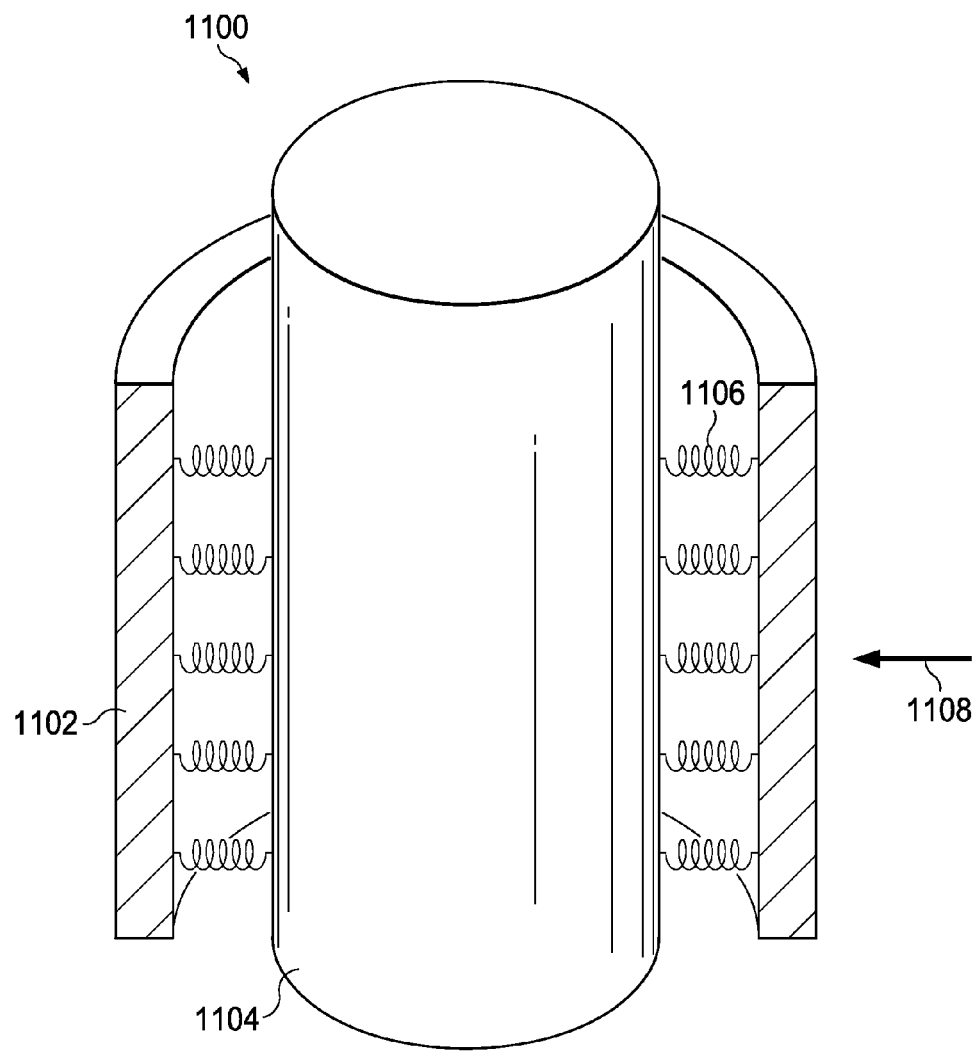
FIG. 17 is a cross-sectional view of a protective device according to the present invention as applied to an area or object.

FIG. 17 is a protective member 1100 according to the present invention as applied to a device to shield objects, a user or areas from an impact and to protect individuals or vehicles that may be impacting the protective member 1100. Protective Member 1100 includes an outer layer 1102, an inner layer 1104 and connectors 1106. The connectors 1106 have a longitudinal axis and are under tension along their longitudinal axis. Connectors 1106 can be extension springs. The Protective Member 1100 is configured so as to afford relative movement between outer layer 1102 and inner layer 1104. Outer layer 1102 can absorb a force 1108, including a force caused by a snow skier, football player or automobile. As an external force 1108 reaches outer layer 1102, connectors 1106 generally on the opposite side of protective member 1100 are subjected to a greater tension force and exhibit elongation along their longitudinal axis. As such connectors 1106 resist such elongation, they absorb the impact forces. After the force is absorbed, the connectors 1106 seek to regain their original orientation. Protective member 1100 serves to reduce the amount of force from an impact that is transferred to the protected area, thus reducing the amount impact force reaching the area. Protective member 1100 also serves to protect an individual so as to reduce the amount of injury that an individual would otherwise incur from an impact with an object. In addition, protective member 1100 serves to decrease the impact forces experienced by the force 1108 (e.g. a skier). In addition, the movement of outer layer 1102 relative to inner layer 1104 reduces the force of impact experienced by a person serving as the impact force (e.g. a skier) that would otherwise occur from an impact. Outer layer 1102 can be made of any standard material useful to absorb impacts, including padding or other conventional protective material. Outer layer 1102 can also be placed under such existing materials. Inner layer 1104 and outer layer 1102 are preferably concentric cylinders. Inner layer 1104 preferably conforms to the shape of the item, user or object being protected, such as a ski lift pole, goal post, upper and or lower arm of a user, upper and or lower leg of a user, or shield posts used in parking lots. Inner layer 1104 can also be the shielded device (e.g. the ski lift pole). As used on a user's lower leg, protective member 1100 can serve as a shin guard for soccer. Protective member 1100 can be used on any part of a user's arm or leg, including separate members for the upper legs, lower legs, upper arms and lower arms. As used in military applications, numerous protective members 1100 can be used to protect the legs and arms of a soldier, including wherein the outer layer 1102 and or the inner layer 1104 are made of standard bullet-proof material. Preferably in the military applications, a second plurality of connectors are configured so as to alter the direction of the impact force 1108 away from the protected extremity, with such second plurality being placed under tension after at least one of the first plurality of connectors have been elongated a first distance along its longitudinal axis in response to an impact force 1108. For example, where the second plurality of connectors are connected at 45 degree angles along the full circumference of the protective member 1100 such that they appear to form a spiral, these secondarily engaged connectors will serve to rotate the outer layer 1102 relative to the inner layer 1104 and redirect the direction of impact force 1108 away from the protected extremity. One or more additional outer layers can be used so as to afford greater force absorption and/or to assist in redirecting the direction of impact away from the shielded object or area. In one embodiment, the connectors are angled such that a downward impact force aligned with the spine is redirected so as to reduce the amount of neck and spinal compression that would otherwise occur.

Each embodiment of the present invention can include tethers between the inner layer and the outer layer that are not initially pulled taught but rather have slack but that are pulled taught after an impact so as to limit the relative travel of the layers. The tethers can be completely resistant to elongation along their longitudinal axis or can allow some elongation but only under extreme forces such as experienced by a projectile such as a bullet. Tethers can be made of wire or other material resistant to elongation. Tethers are not elastic and do not exhibit a tension force. Tethers that become elongated after use should be replaced. Tethers can serve to prevent further relative motion of the layers. Tethers can serve to prevent the inner layers and outer layers from touching. Tethers can serve to keep the layers from rotating too much relative to each other.

Each embodiment of the present invention (e.g. a helmet embodiment) can include a first and second plurality of connectors with the first plurality of connectors having each a longitudinal axis and being under tension along their longitudinal axis. The first plurality of connectors absorb energy from an impact force by resisting further tension along said longitudinal axis and elongating a first distance as measured along said longitudinal axis. In addition, a second plurality of connectors can be included wherein each said connector has a longitudinal axis and can be placed under tension along said longitudinal axis after at least one of the connectors in the first plurality of connectors elongate the first distance. Thus, the first plurality of connectors absorb energy from an impact force by resisting further tension along said longitudinal axis and elongating a first distance as measured along said longitudinal axis; and the second plurality of connectors absorb energy from an impact force by resisting further tension along said longitudinal axis after at least one of the first plurality of connectors elongating that first distance. Each plurality of connectors allow the outer layer and inner layer to move relative to each other and reduce the amount of force from an impact that is transferred to the user or protected area. The first plurality of connectors are preferably comprised of extension springs. The second plurality of connectors are preferably comprised of elastomeric material. The second plurality of connectors can be connected to the outer layer so as to induce rotation of the outer layer relative to said inner layer after at least one of said first plurality of connectors have been elongated the first distance. A plurality of tethers can also be included that are not placed under tension until after at least one of the second plurality of connectors has been placed under tension and wherein the tethers prevent further relative motion of the layers such as preventing the layers from colliding.

Method of Manufacture of Customized Protective Members.

The present invention includes a method to manufacture a customized protective member. The steps of the method include determining the shape of the object or area to be protected, manufacturing an inner layer to conform thereto, connecting the inner layer to the outer surface through a plurality of connectors according the present invention. Additional steps can include the use of 3-D printers to manufacture in the inner layer of the embodiments of the invention. A scanner can be used to scan the user's body (e.g. head, torso, foot or hand) or other objects and create digital models for 3-D printing. The steps include placing the object on or near the canner, scanning the object using the laser, saving the data from the scan and transferring the data to a 3-D printer.

Each of the features described above for one embodiment of the invention can be applied to the other embodiments of the invention. Moreover, the connectors for each embodiment can possess the same force absorption characteristics as the connectors for any given embodiment.

Those of skill in the art understand that various changes and modifications can be made to these preferred embodiments without departing from the invention disclosed and claimed herein. All such changes and modifications are intended to be covered by the following claims:

What is claimed is:

1. A protective member for protecting the torso of a user comprising:
    an outer layer having a top opening for the neck of a user, a bottom opening for the lower extremities of a user and first and second arm opening for the arms of a user;
    an inner layer connected to said outer layer by a plurality of connectors wherein each said connector has a longitudinal axis and further have a first opening for the neck of a user, a bottom opening for the lower extremities of a user and first and second arm opening for the arms of a user;
    each of said plurality of connectors being under tension along said longitudinal axis;
    wherein said plurality of connectors absorb energy from an impact force by resisting further tension along said longitudinal axis;
    wherein said connectors allow said outer layer and said inner layer to move relative to each other and reduce the amount of force from said impact that is transferred to the torso of a user.

2. The protective member of claim 1 for protecting the torso of a user wherein the connectors on the opposite side of the member from the side of an impact absorb the force of impact and allow said outer layer to move farther away from said inner layer whereas on the side of said impact said outer layer moves closer to said inner layer.

3. The protective member of claim 1 for protecting the torso of a user wherein the connectors seek to regain their original orientation after an impact.

* * * * *